United States Patent [19]

Weiler et al.

[11] Patent Number: 4,707,966

[45] Date of Patent: Nov. 24, 1987

[54] CONTAINER WITH AN ENCAPSULATED TOP INSERT AND METHOD AND APPARATUS FOR MAKING SAME

[75] Inventors: Gerhard H. Weiler, South Barrington; Paul A. Anderson, Arlington Heights; Kenneth A. Fox, Lake Zurich, all of Ill.

[73] Assignee: Automatic Liquid Packaging, Inc., Woodstock, Ill.

[21] Appl. No.: 296,368

[22] Filed: Aug. 26, 1981

[51] Int. Cl.$^4$ .................. B65B 3/02; B65B 43/00; B65B 61/22; B65B 61/18

[52] U.S. Cl. .................................... 53/410; 53/412; 53/420; 53/452; 53/140; 53/128; 53/133; 53/558; 425/524; 264/524; 264/525

[58] Field of Search ............... 53/453, 559, 140, 420, 53/410, 452, 412, 129, 133, 128, 558; 425/524; 264/524, 525

[56] References Cited

U.S. PATENT DOCUMENTS

| Re. 27,155 | 10/1964 | Hansen | 425/524 |
|---|---|---|---|
| 3,251,915 | 5/1966 | Pechthold | 264/524 |
| 3,409,710 | 11/1968 | Klygis | 264/524 X |
| 3,690,803 | 9/1972 | Pechtold et al. | 53/453 X |
| 3,851,029 | 11/1974 | Cornett III, et al. | 264/525 |
| 3,919,374 | 11/1975 | Komendowski | 264/525 X |
| 4,176,153 | 11/1979 | Weiler et al. | 425/524 X |
| 4,425,090 | 1/1984 | Hansen | 264/525 X |

*Primary Examiner*—Horace M. Culver

*Attorney, Agent, or Firm*—Dressler, Goldsmith, Shore, Sutker & Milnamow, Ltd.

[57] ABSTRACT

Apparatus and method for molding, forming and filling a container having an insert at the container top are disclosed. According to the preferred form of the method and apparatus, a length of a hollow tube parison is extruded and then cut, molded, and filled while positioned between main mold halves. A stopper or like insert is tranferred to a holding and insertion member and when a blowing and filling nozzle has been completely removed from the top opening of the filled container, the blowing and filling nozzle and the insertion member that is carrying the stopper are moved together to position the insertion member and stopper over the container. The insertion member is then moved downwardly to deposit the stopper within the upwardly extending portion of the parison tube. Upper sealing molds are then closed to form the upper portion of the parison around the stopper to partially encapsulate the stopper. A frangible web may also be formed by the upper sealing molds in a portion of the parison circumferentially around and above the stopper while using the insertion member as an anvil. A break-off tab or overcap may be subsequently formed above the stopper at the frangible web by an additional set of upper sealing molds after the insertion member is retracted. In use, the tab may be broken away at the frangible web to expose an upper surface of the stopper and permit access to the stopper.

24 Claims, 25 Drawing Figures

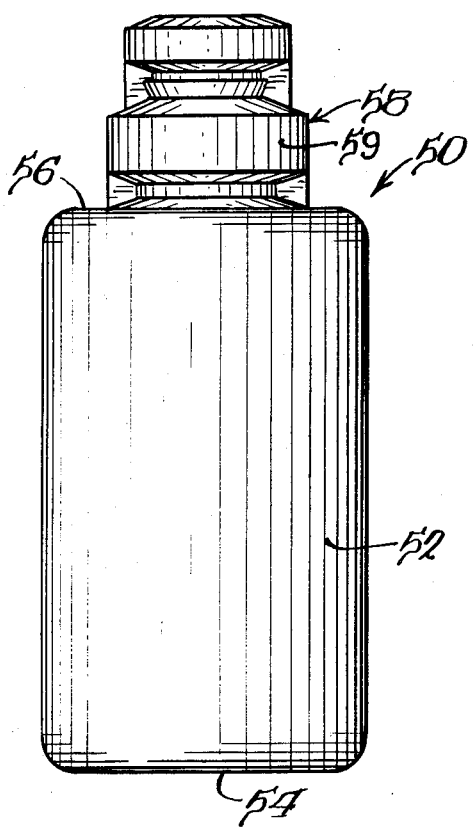
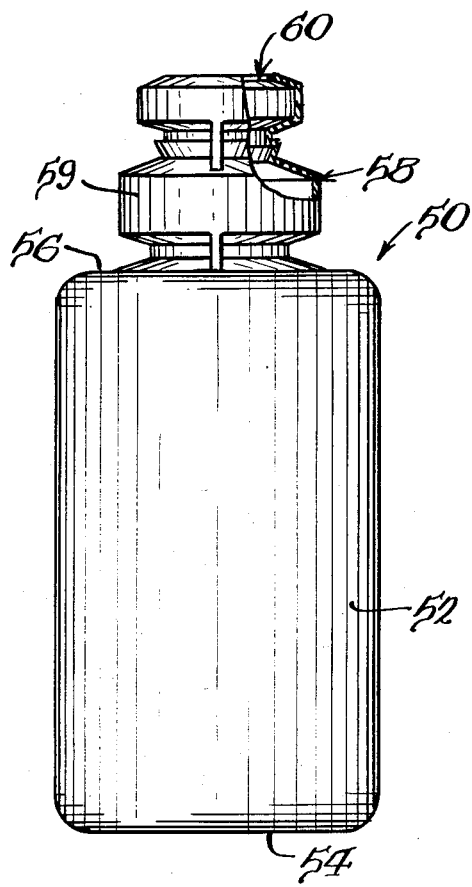
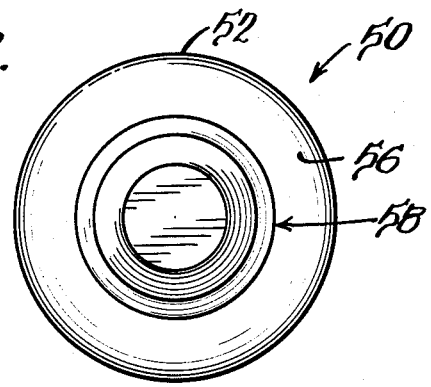

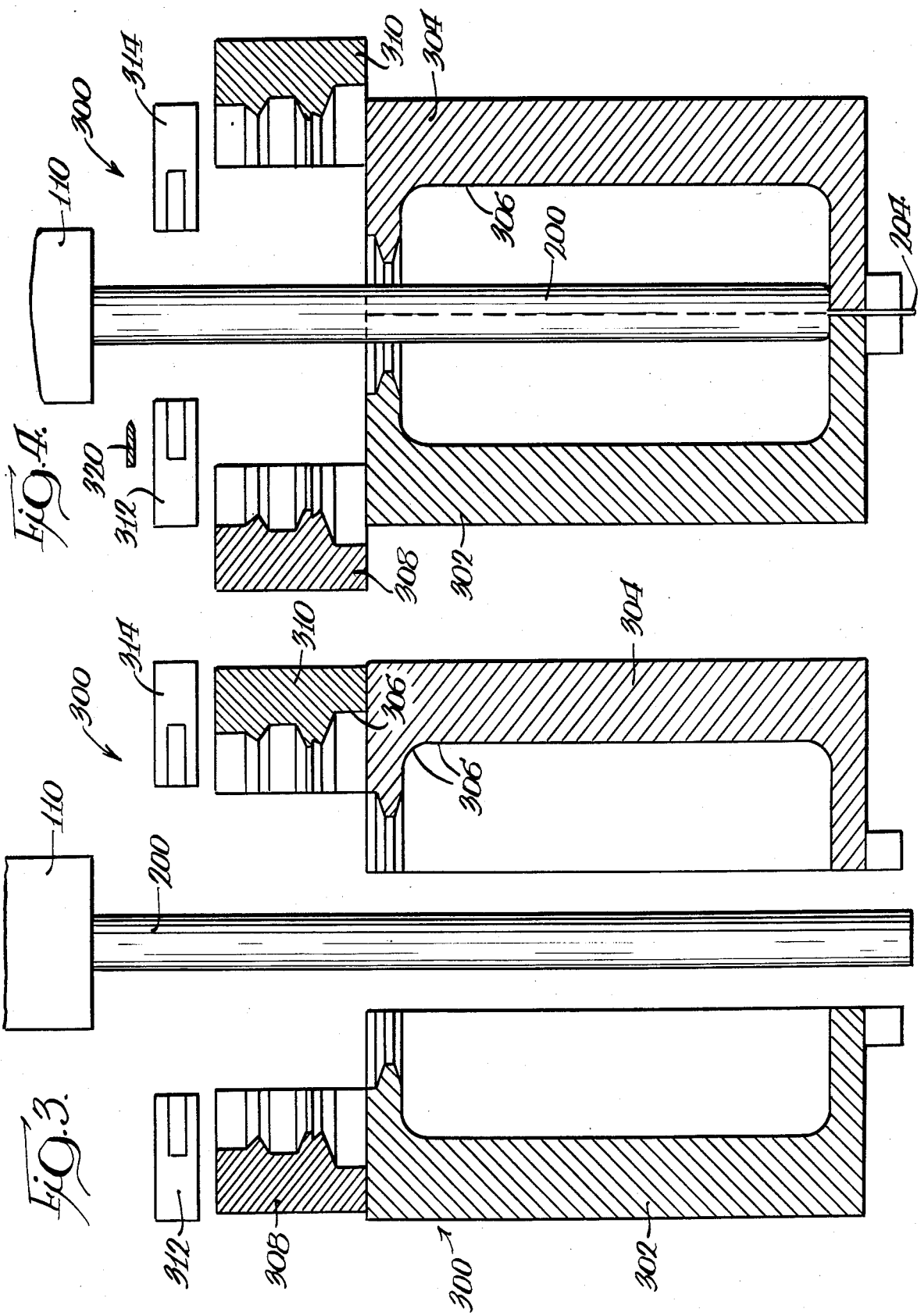

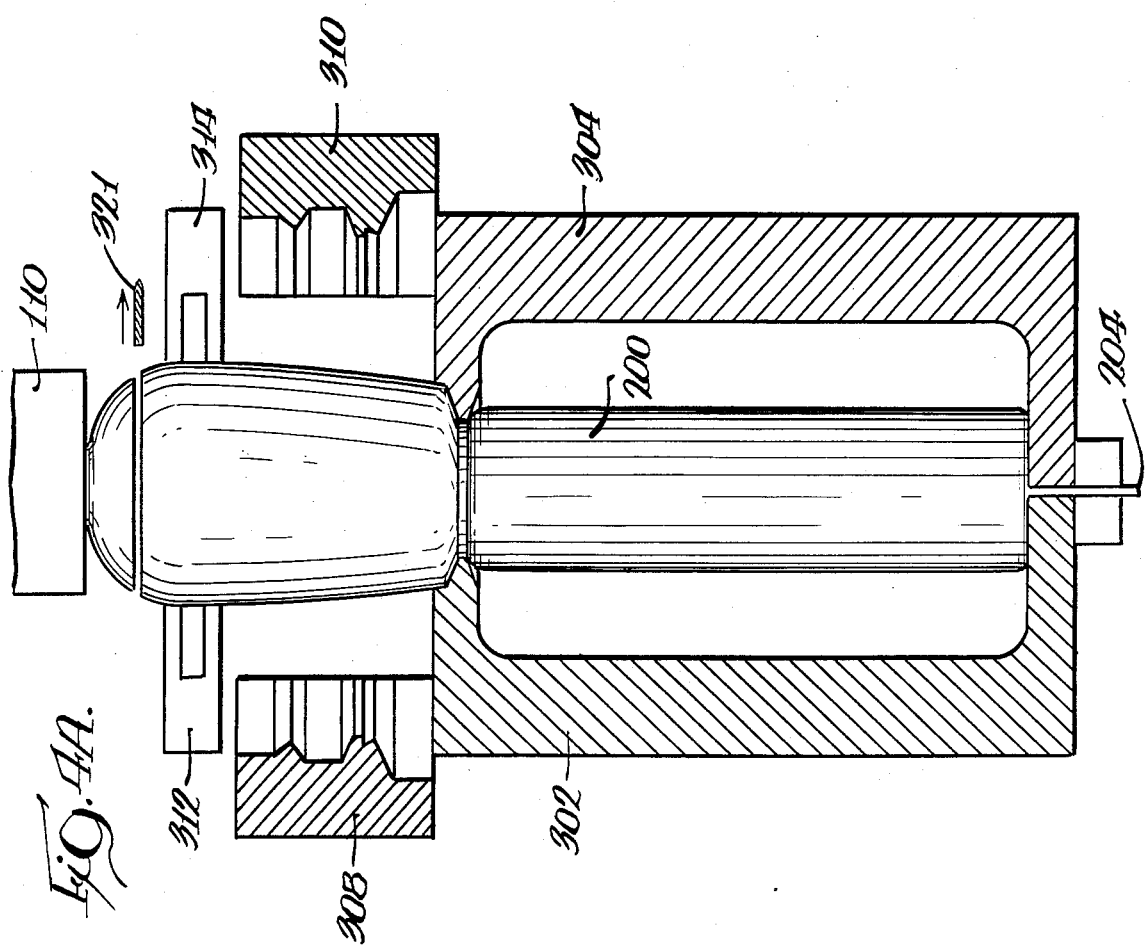

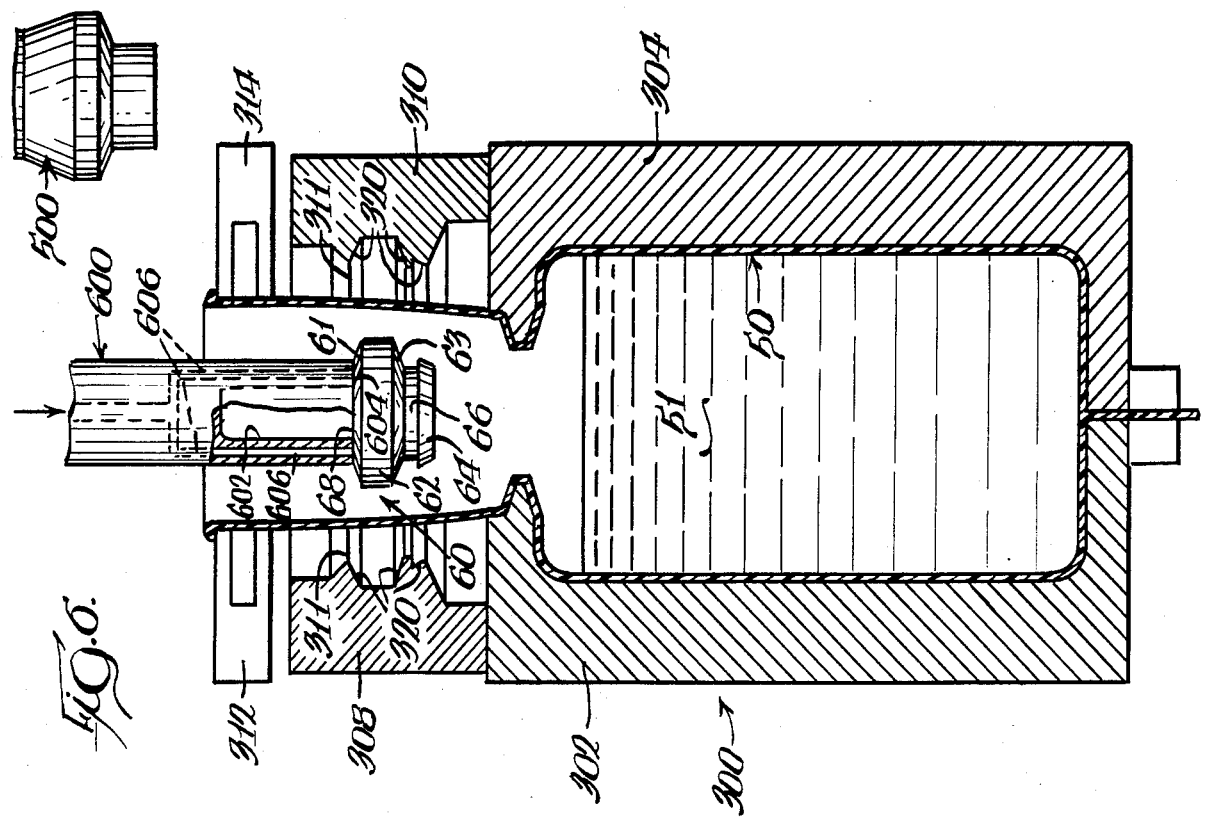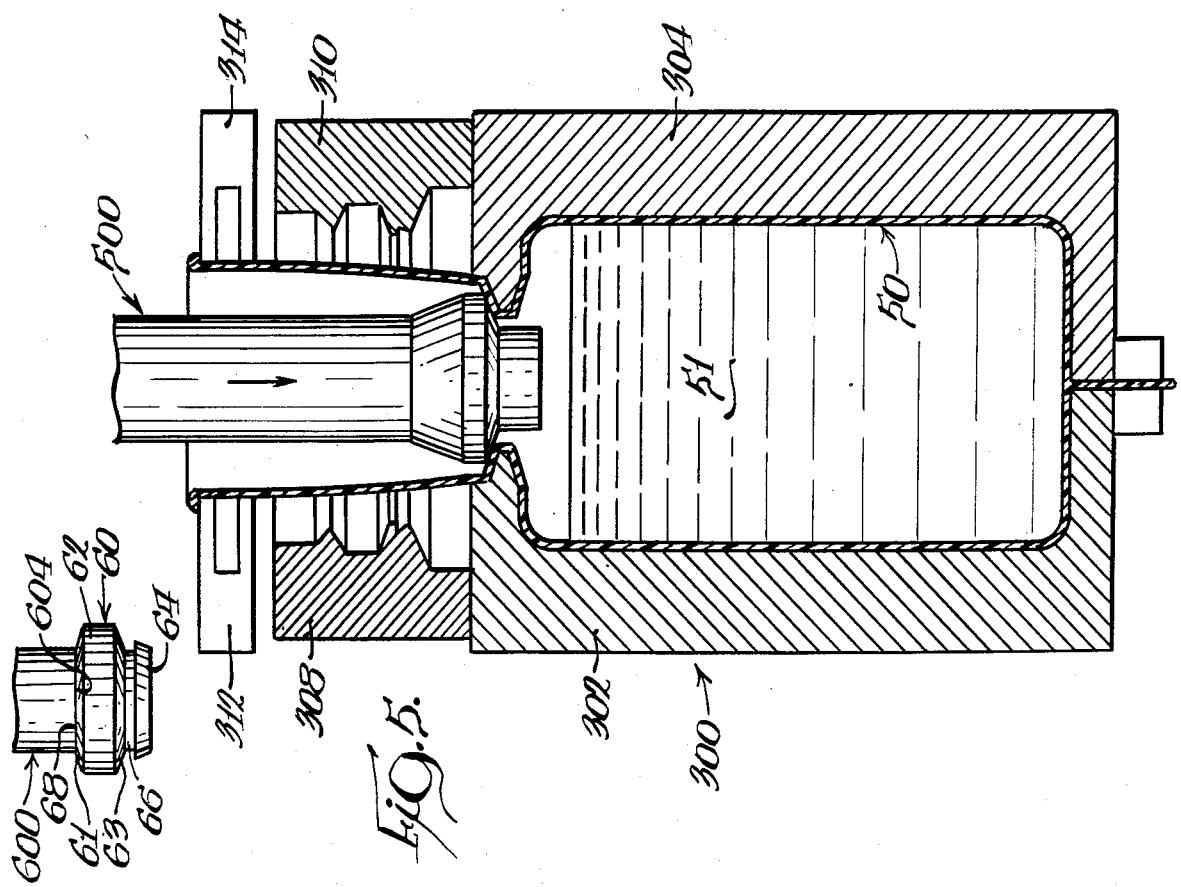

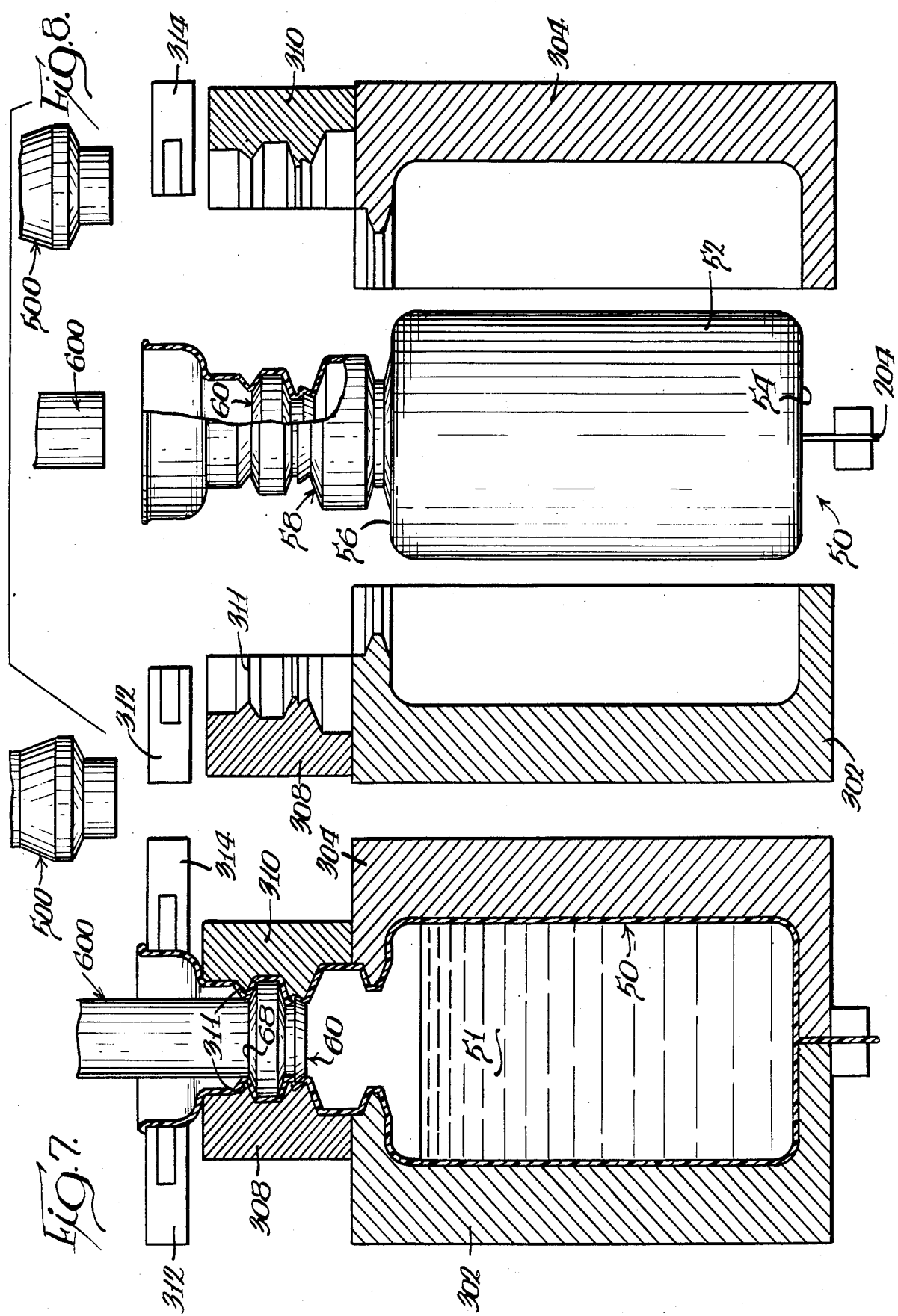

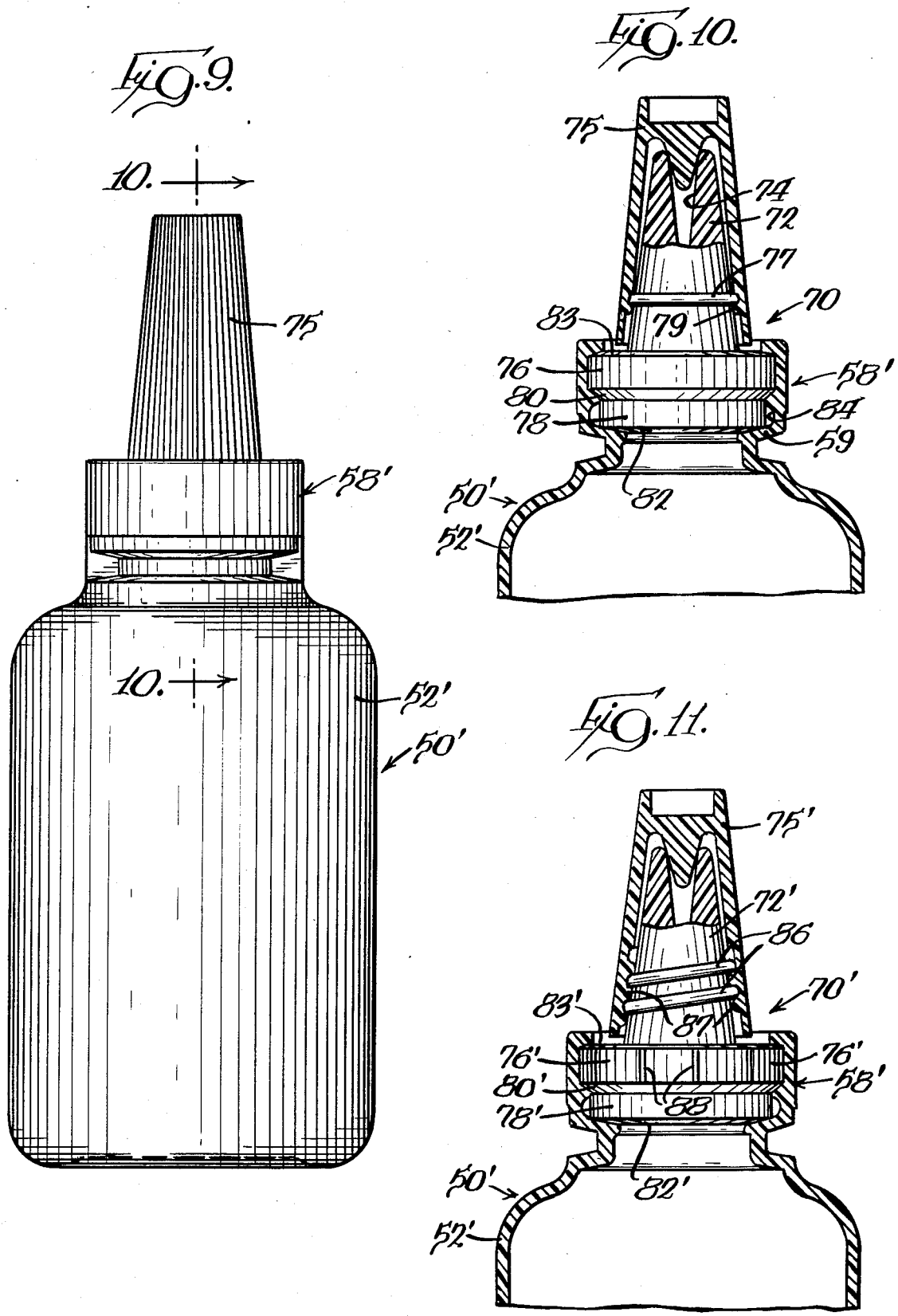

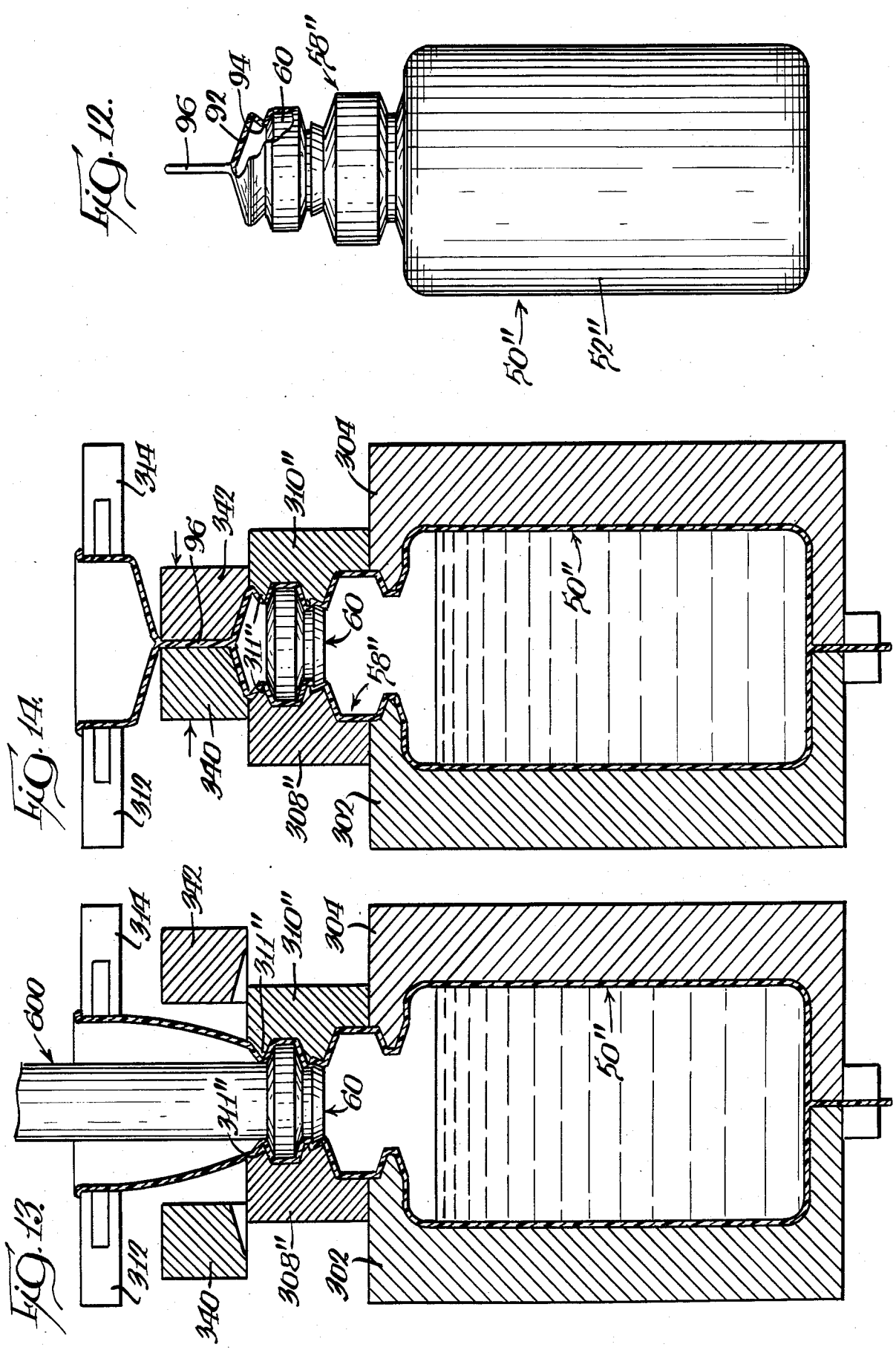

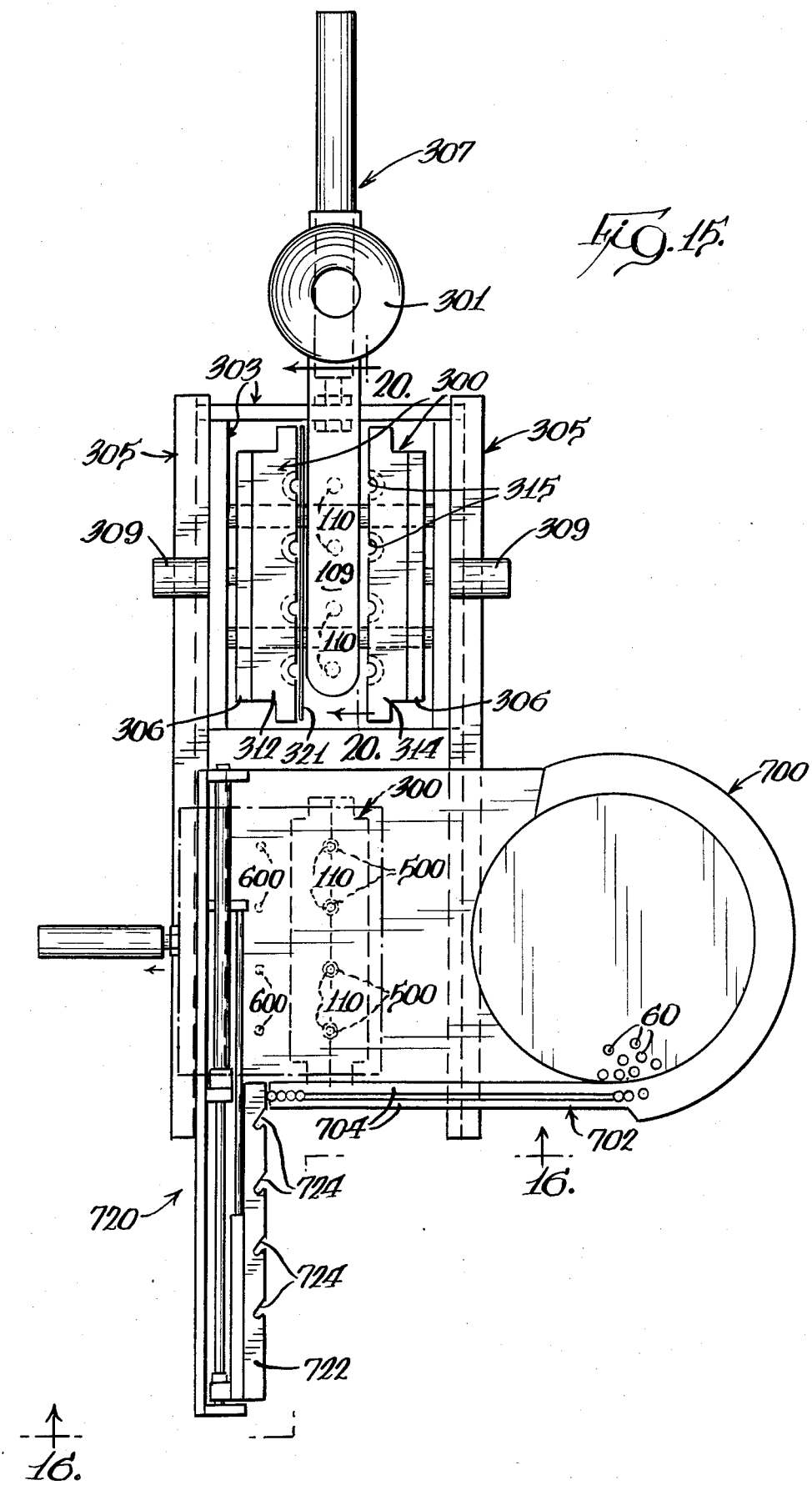

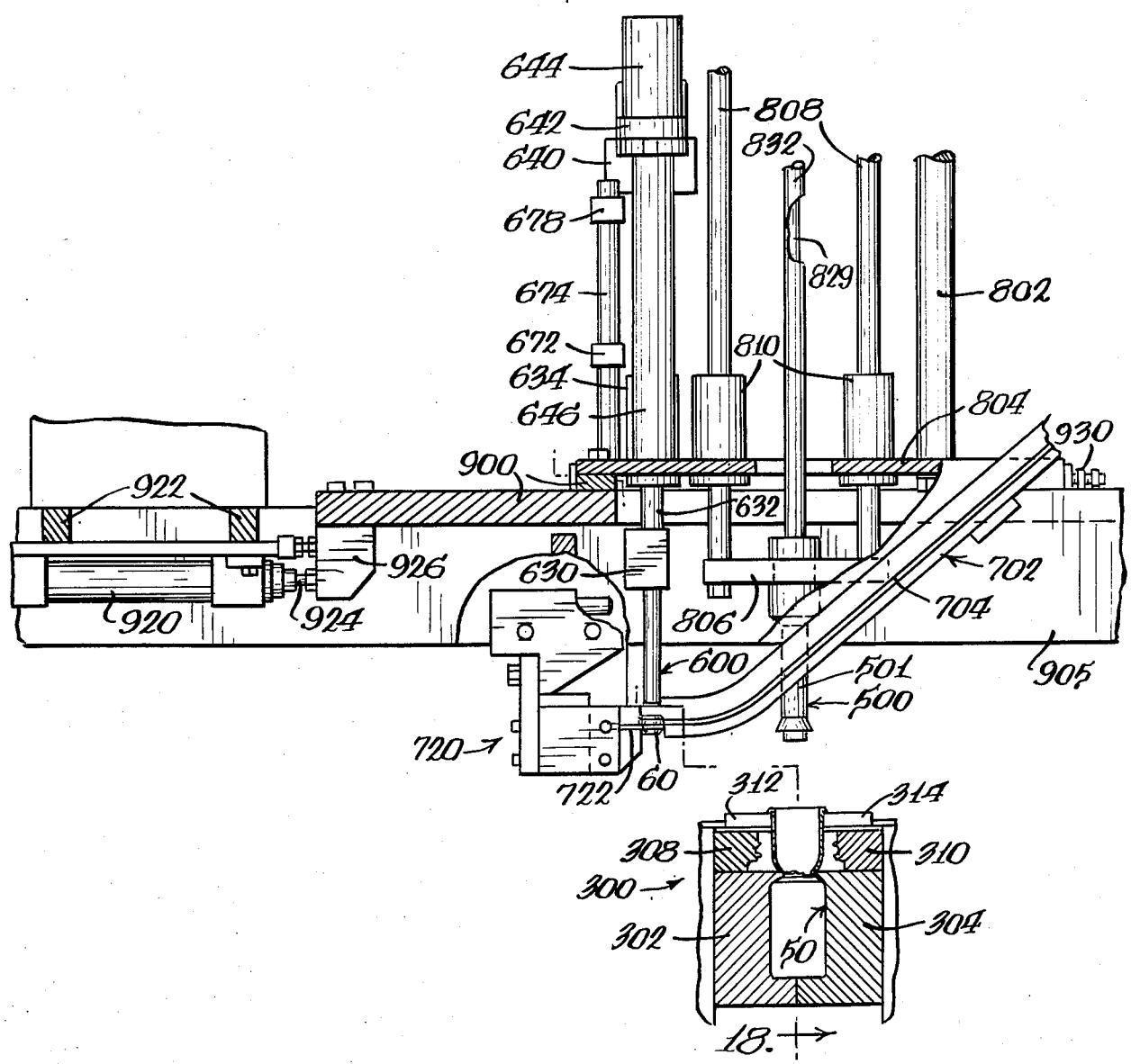

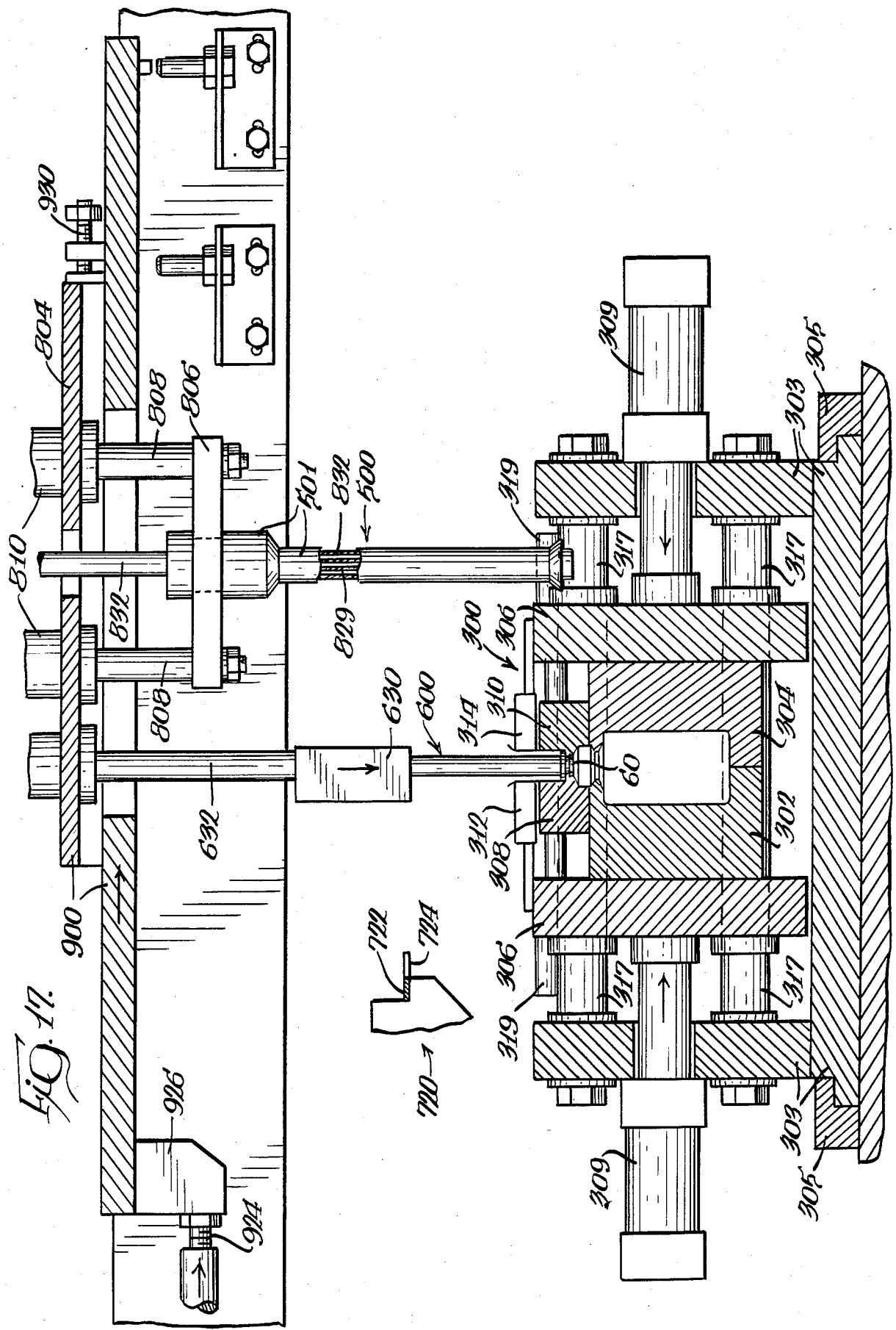

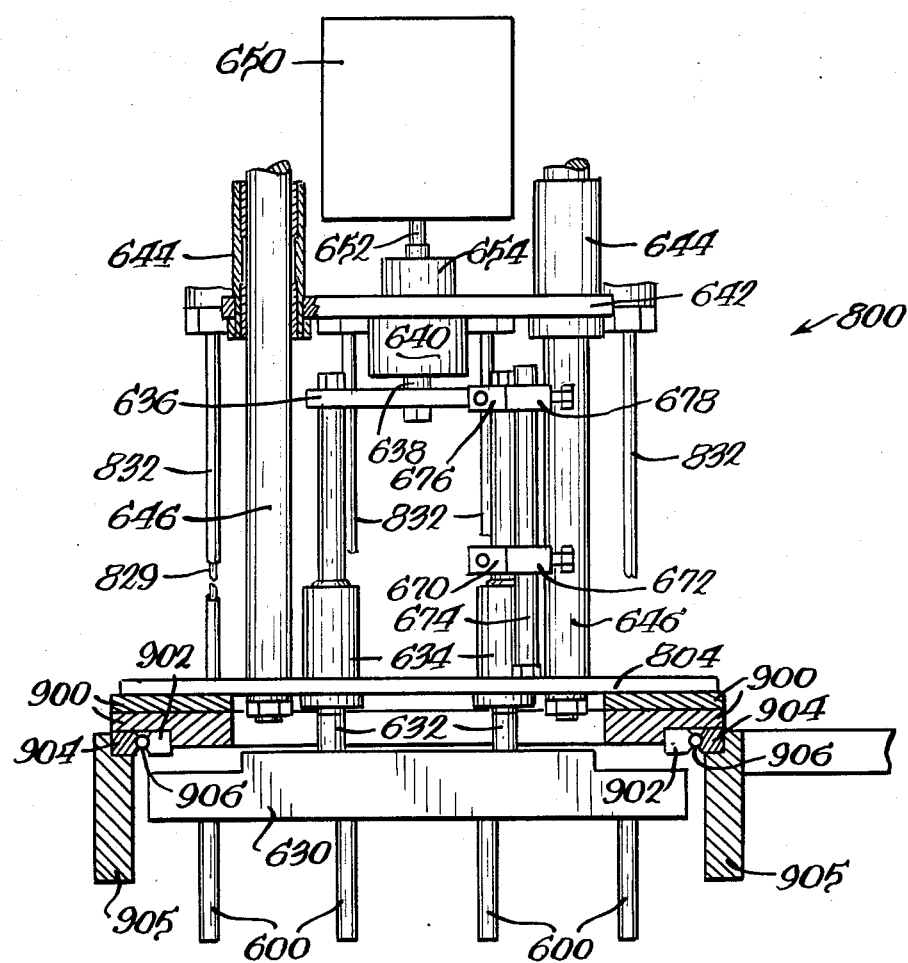
Fig. 18.
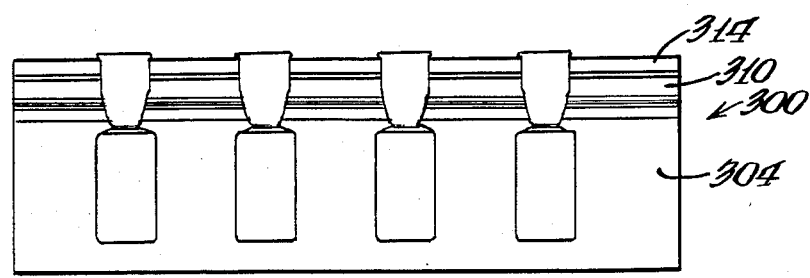

CONTAINER WITH AN ENCAPSULATED TOP INSERT AND METHOD AND APPARATUS FOR MAKING SAME

DESCRIPTION

Technical Field

This invention relates, in general, to an improved method for blow molding and filling a container and performing a secondary operation at the top opening of the container before it is sealed.

BACKGROUND OF THE INVENTION

Various patents disclose methods and apparatus for blow molding a hollow thermoplastic article. See for example U.S. Pat. Nos. 3,137,748 and 3,288,898.

Also, a method has been disclosed in U.S. Pat. No. 3,330,006 for molding a container headpiece and closure structure onto a preformed thermoplastic container body.

More complicated processes for forming, blow molding, and filling a container are disclosed in the U.S. Pat. Nos. 3,464,085; 3,523,401; 3,597,793; 3,664,793; 3,674,405; 3,919,374; Re. 27,155 and patents cited therein.

Of particular interest is the method for forming and filling container with a plug attachment molded in the bottom of the container as disclosed in the U.S. Pat. No. 3,919,374. The method may be effected with apparatus of the type disclosed in the U.S. Pat. No. Re. 27,155. Specifically, a parison in the form of a hollow tube is continuously extruded by an extruder in a tubular shape between two coacting first or main mold halves. At the bottom of the main mold halves, a plug attachment, such as a rubber stopper, is positioned by means of a vacuum holder in a secondary cavity formed in the bottom portion of the main mold halves. The parison has a length sufficient that a portion of the parison extends below and about the stopper.

When the parison is of the desired length, the main mold halves are closed around the lower portion of the length of the parison. The upper portion of the parison extends out of the mold halves through a top opening defined by the closed main mold halves. When the main mold halves are closed, the parison which surrounds the stopper is pinched closed by coaction of the walls of the main mold halves and the stopper becomes integrally molded as part of the container bottom.

The length of the the parison is then cut off below the extruder and above the main mold halves with the upper portion of the cut-off length of the parison tube held open by a set of vacuum holding or gripping jaws.

Next, the assembly of the closed main mold halves and parison is moved to a position under a blowing and filling nozzle assembly. The vacuum holding jaws move with the main mold halves and continue to hold open the upper portion of the parison above the main mold halves. The blowing and filling nozzle assembly has a mandrel that is moved downwardly into the opening of the tubular parison until it presses the parison against the neck of the main mold top opening and forms a seal. The container is then formed by blowing filtered gas through a nozzle of the assembly into the parison to expand the parison outwardly against the walls of the main mold cavity. Vacuum can also be employed for this purpose in lieu of or in addition to blowing with gas.

Next, the compressed air is vented from the formed container through the assembly and a metered amount of liquid product is forced into the bottle through a fill nozzle of the assembly. As the product contacts the plastic walls, the container solidifies. The main mold halves may be internally cooled in some applications to promote more rapid solidification.

When the container is filled with the desired amount of liquid, the blowing and filling nozzle assembly is retracted to its original position. At this point in the cycle, the length of parison between the top of the main mold halves and the holding jaws is still soft or semi-molten. A separate pair of coacting second or upper sealing mold halves are then moved together around the exposed length of parison to form the container upper portion immediately above the container main mold halves and below the holding jaws.

After the container is sealed at the top, the container main mold halves and the separate upper sealing mold halves open, along with the parison holding jaws. The finished container, completely formed, filled, and sealed, is then conveyed out of the machine by conventional techniques.

Although the above-discussed method of U.S. Pat. No. 3,919,374 for forming and filling a container with a stopper molded in the bottom of the container works satisfactorily in many applications, there are conditions inherent in this method that must be recognized and accommodated by careful design and operation of apparatus for effecting the method so as to avoid or minimize certain problems.

First, with stopper feeding and placement occuring below the main mold halves, the stoppers can become contaminated by liquid product that may drip from the fill nozzles during the automatic cycling of the apparatus.

Second, conveyor mechanisms are typically required to move the stoppers under the mold halves below the extruder. Such conveyor mechanisms, requiring lubrication, cannot be easily sterilized. Non-sterilized conveyor mechanisms in close proximity with the stoppers may be undesirable when filling the blow-molded containers with sterile product.

Third, the inclusion of a stopper in the bottom of the container precludes the formation of a conventional flat bottom on the container. Thus, conventionally shaped, flat bottomed containers that are self-supporting cannot be made with a bottom inserted stopper.

Fourth, when a stopper is initally positioned in the bottom region of the open main mold halves, it is difficult to ensure that the extruding length of hollow tubular parison flows vertically downwardly, without curl, and then properly around the stopper. If the extruding length of hollow tubular parison does not properly surround the stopper at the bottom of the open mold halves, the subsequently molded container may have an improperly formed bottom with one or more accidentally formed apertures through which the filling product can drain and splash onto the stopper insertion mechanisms. This may contaminate other stoppers.

Fifth, where the stopper is positioned and molded at the bottom of the container, the stopper insertion mechanisms typically occupy a significant amount of space below the mold assembly which precludes the use of standard mechanisms for take-out and deflashing of the molded container.

Until the present invention, the various disadvantages associated with bottom stopper insertion techniques described above had to be accommodated. The present invention now substantially eliminates these disadvantages by providing a method and apparatus for molding a container without effecting any secondary stopper insertion operations at or in the bottom of the container during the molding of the container.

Further, the present invention contemplates, in general terms, a method and apparatus for effecting one or more secondary operations at the container top opening after the container has been molded, but before it has been sealed or, in some cases, even before it has been filled with the desired product. It would be desirable to provide such a method and apparatus wherein such secondary operations are effected at the top of the container so that the base of the container can be made substantially flat and smooth so that the container is self-supporting on its base.

Further, it would be advantageous to provide an attached, but removable, plug or stopper in the top of a flat bottomed container to prevent spillage during subsequent handling. Such spillage, in addition to obviously reducing the liquid content in the container, could contaminate the molding or filling mechanisms and other associated apparatus.

It would also be desirable with such a flat bottomed container to provide an attached plug or stopper in the top of the container wherein the plug is wholly or partially encapsulated or sealed by a formed extension of the container thermoplastic wall and wherein the formed thermoplastic extension could be severed from the containers when desired to permit access to or removal of the plug or stopper.

SUMMARY OF THE INVENTION

A method and apparatus is disclosed for molding a flat bottomed thermoplastic container, filling the container from the top, effecting a secondary operation at the top of the container—either before or after filling the container, and then sealing the container. The secondary operation can include, in one embodiment, positioning an insert article or other auxliary component (e.g., a stopper, nozzle, or the like) in the top opening of the container, and then partially or completely encapsulating the insert article with the container material in such a way that the encapsulating portion of the material can easily be broken away when desired to gain access to the insert article or to remove the insert article.

According to one preferred form of the method and apparatus, a length of parison is extruded, cut, and molded in two, coacting first or main mold halves to form a body portion of a flat bottomed container by means of conventional techniques. The container is next filled by means of conventional techniques that include the use of a blowing and filling nozzle assembly. Before or during the removal of the blowing and filling nozzle assembly from the filled container in the closed main molds, the insert article, such as a stopper, is transferred to an insertion member that holds the stopper by means of vacuum.

When the blowing and filling nozzle assembly has been completely removed from the container, the blowing and filling nozzle assembly and the insertion member that is carrying the insert article, e.g., stopper, are moved together to position the insertion member and the insert article over the container. The insertion member is then moved downwardly to position the insert article above or in the top opening of the container where it is surrounded by the upwardly extending, pliant portion of the parison tube. A pair of coacting second or upper sealing mold halves are then closed above the main mold halves to mold the upper portion of the parison around the insert article to at least partially encapsulate the insert article.

If desired, a circular frangible web may be formed by the upper sealing mold halves in a portion of the parison covering the upper surface of the insert article while using the insertion member as an anvil. A break-off tab or overcap may be subsequently formed above the insert article at the frangible web by a pair of coacting third or top sealing mold halves after the insertion member is retracted. When the completed container is to be used, the overcap may be broken away at the frangible web to expose the insert article and permit access thereto.

In any case, after the container top is formed as desired around the stopper or other insert article, the parison holding jaws and the container main mold halves, along with the top and/or upper sealing mold halves are opened. The finished container is then conveyed out of the apparatus by conventional techniques.

The present invention also permits the manufacture of empty, i.e. unfilled sample-collecting containers having a top insert by omitting the filling step and proceeding with the sealing operation immediately after the molding operation is completed.

Numerous other features of the disclosed method and apparatus will be apparent from the following detailed description and accompanying drawings.

BRIEF DESCRIPTION OF THE DAWINGS

In the accompanying drawings forming part of the specification, and in which like numerals are employed to designate like parts throughout the same, FIGS. 1 and 1A. are side views, rotated 90° from each other, of a first embodiment of a container with an encapsulated stopper;

FIG. 2 is a top view of the container of FIG. 1;

FIGS. 3, 4, 4A and 5-8 are schematic diagrams, partly in section and generally illustrating the manner in which the container of FIGS. 1-2 is formed by the apparatus in FIGS 15-23;

FIG. 9 is a side view of a modified form or second embodiment of a container with a dispensing nozzle insert and separate, snap-on overcap;

FIG. 10 is a fragmentary, cross-sectional view taken generally along plane 10—10 in FIG. 9;

FIG. 11 is a view similar to FIG. 10, but showing a modification of the second embodiment of the container having a nozzle with a separate, threaded overcap;

FIG. 12 is a side view of a third embodiment of the container;

FIGS. 13 and 14 are scematic diagrams, partly in section and generally illustrating the manner in which the container of FIG. 12 is formed;

FIG. 15 is a plan view of the major mechanisms of the apparatus for effecting the methods illustrated in FIGS. 3-8 for forming, filling, and sealing a container with a top insert;

FIG. 16 is a fragmentary cross-sectional view taken generally along the planes 16—16 in FIG. 15 with some of the structure broken away for clarity;

FIG. 17 is a view similar to FIG. 16, but enlarged and showing just the lower portion of the apparatus with the stopper being positioned in the mold assembly;

FIG. 18 is a fragmentary, cross-sectional view of the apparatus taken generally along the plane 18—18 in FIG. 16;

DECRIPTION OF THE PREFERRED EMBODIMENT

Figure 19:
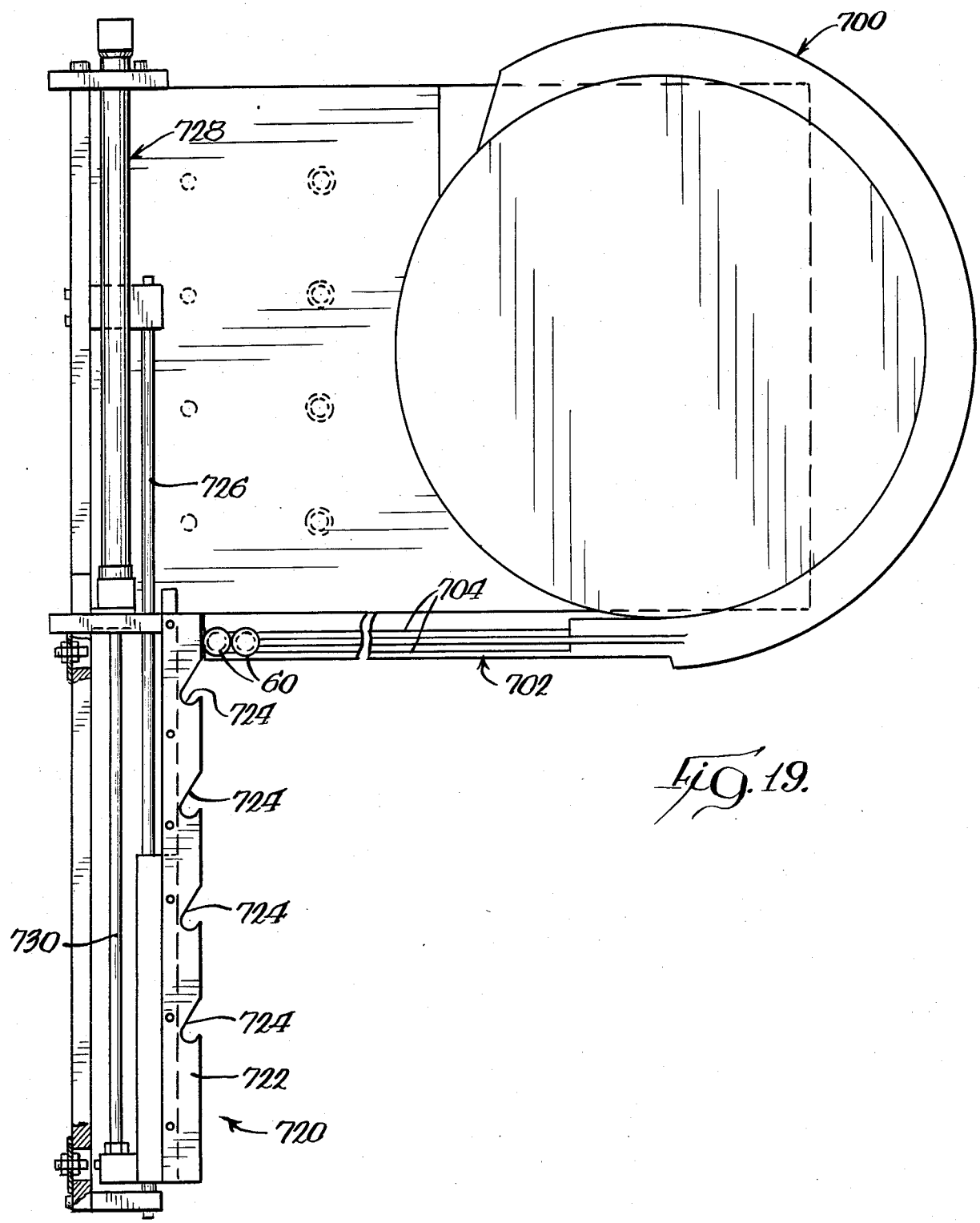
FIG. 19 is an enlarged, fragmentary plan view of the stopper feeder mechanism of the apparatus of FIG. 15.

This invention may be used in many different forms. This specification and the accompanying drawings disclose only one specific form as an example of the use of invention. The invention is not intended to be limited to the embodiment illustrated, and the scope of the invention will be pointed out in the appended claims.

The precise shapes and sizes of the components herein described are not essential to the invention unless otherwise indicated.

For ease of description, the apparatus of this invention will be described in a normal (upright) operating position and terms such as upper, lower, horizontal, etc., will be used with reference to this position. It will be understood, however, that the apparatus of this invention may be manufactured, stored, transported, used, and sold in an orientation other than the position described.

The apparatus of this invention has certain conventional drive mechanisms and control mechanisms the details of which, though not fully illustrated or described, will be apparent to those having skill in the art and an understanding of the necessary functions of such mechanisms.

For ease of understanding the present invention, a thermoplastic container structure will first be described. This will be followed by a description of a method for molding the container, filling the container from the top, effecting a secondary operation at the top of the container—either before or after filling the container—and then sealing the container. This is followed by a description of modified forms of the container and of modifications of the method. Finally, a preferred form of an apparatus for effecting the method will be described.

The Container: First Embodiment

A formed, filled, and sealed container 50 is illustrated in FIGS. 1, 1A and 2. The container 50 is preferably fabricated from conventional thermoplastic molding materials such as polyethylene (low or high density), polypropylene, polycarbonate acetate, acrylonitrile-butadiene-styrene (ABS), and the like materials compatible with the container contents.

The teachings of the present invention find application in the production of filled and unfilled containers having a wide variety of shapes and sizes. Container 50 is an example of one such container and includes a generally cylindrical, hollow body portion 52 having a bottom 54 and a top 56. The top 56 of the container body portion 52 terminates in a top closure structure 58.

The container closure structure 58 may be designed to be pierced by a cannula, spike, hypodermic syringe, or the like, by providing a stopper or a pierceable membrane as part of the structure, by which the container contents may be withdrawn. In one preferred form of the container 50, the top closure structure 58 includes an insert article, such as a plug attachment or stopper 60, which is positioned to occlude the container access aperture or opening and which is at least partially encapsulated by the container molding material in the top closure structure 58 to form a leak-tight assembly. The enlarged cylindrical hub portion 59 is not essential but is provided to receive an overcap for stopper 60.

Method for Making the Container

The preferred method for first forming the container 50 by molding, for next filling the container, for then positioning the stopper 60 in the top of the container, and for finally sealing the container will next be discussed with reference to the simplified, partial cross-sectional schematic diagrams of FIGS. 3-8. These figures progressively illustrate the sequence of the steps of the method.

As best illustrated in FIG. 3, the method of forming the container is initiated at an extruder head 110 of conventional design. The extruder and head 110 are adapted to extrude a length of parison 200 in the form of a vertically oriented, elongated, hollow tube of a semi-molten thermoplastic material.

Before, during, or after the parison 200 is extruded to the desired length, a mold assembly 300 is positioned in spaced relationship from and around the parison 200. The mold assembly 300 includes a lower, first, or main mold comprising mold half 302 and mold half 304. The assembly 300 also includes a pair of two coacting second or upper sealing mold halves 308 and 310 and a pair of two vacuum operable holding jaws 312 and 314.

The first or main mold halves 302 and 304 cooperate when moved together to define a first cavity 306 for the container 50 (FIGS. 1, 1A, and 2). The container cavity 306 ultimately serves to define the sidewall of the container body portion 52, the container bottom 54, the container top 56, and a lower portion of the container closure structure 58.

In FIG. 3, the first or main mold halves 302 and 304 are shown in open position in which they are spaced apart by a distance sufficient to permit the parison 200 to hang between them. The first or main mold halves 302 and 304 can be moved together from the main mold open position illustrated in FIG. 3 to a main mold closed position illustrated in FIG. 4 by suitable means, such as a pneumatic cylinder actuator or actuators (not illustrated). When the main mold halves 302 and 304 are in the closed position illustrated in FIG. 4, the main mold halves are adapted to form the major portion of the container 50 as will be described in detail hereinafter.

The second or upper sealing mold halves 308 and 310 are positioned in sliding engagement with the tops of the first or main mold halves 302 and 304. The second or upper sealing mold halves 308 and 310 are preferably carried by the first or main mold halves 302 and 304 and are thus movable with the main mold halves 302 and 304 between (1) the main mold open position illustrated in FIG. 3 and (2) the main mold closed position illustrated in FIG. 4.

The upper sealing mold halves 308 and 310 are also capable of movement relative to the main mold halves 302 and 304. Specifically, when the main mold halves 302 and 304 are in the main mold closed position, the second or upper sealing mold halves 308 and 310 can be moved by suitable conventional actuators (not illustrated) to a sealing position (FIG. 7) to form the container closure structure 58 as will be described in detail hereinafter.

The vacuum operable holding jaws or parison grippers 312 and 314 are adapted to be moved between an extended gripping position and a retracted position. Means for effecting such movement may be provided separately of the means for moving the first and second mold halves. However, jaws 312 and 314 are preferably mounted for movement with the first mold halves 302 and 304. When the first mold halves 302 and 304 are in the open position illustrated in FIG. 3, the holding jaws 312 and 314 are spaced from the parison 200. When the first mold halves 302 and 304 are in the closed position illustrated in FIGS. 4-7, the holding jaws 312 and 314, having moved with the first or main mold halves 302 and 304, are adapted to engage a portion of the parison 200 extending upwardly above the closed first mold halves 302 and 304. The jaws 302 and 314 grip the parison 200 as a reduced pressure or vacuum is effected by suitable conventional means (not illustrated) between the outer surface of the parison 200 and the inner surfaces of the holding jaws 312 and 314.

When the mold assembly 300 closes about the parison 200 as illustrated in FIG. 4, a portion 204 of the extruded parison projects below the cavity 306 of the first or main mold halves 302 and 304 and forms flash by which the ultimately formed container may be conveyed out of the molding apparatus. The flash may be subsequently severed from, or broken off of, the container bottom.

When the first or main mold halves 302 and 304 are in the closed position illustrated in FIG. 4, the holding jaws 312 and 314 are similarly in the extended gripping position and ready to engage the upper end of the parison 200 that extends above the first and second pairs of mold halves. At this point in the process, pressurized air is discharged from the extruder head through a suitable conventional tube (not illustrated) to expand the parison slightly so that it comes into contact with the parison grippers or holding jaws 312 and 314 as illustrated in FIG. 4A. This parison expansion process is conventional and well known to those skilled in the art. The holding grippers 312 and 314, through the vacuum or reduced pressure effected between the outer surface of the parison 200 and the inner surfaces of the jaws 312 and 314, maintain an opening in the upper end of the parison 200 when the parison is severed from the extruder as will next be described.

With the upper end of the parison 200 prevented from collapsing by the holding jaws 312 and 314, the parison 200 is severed, as illustrated in FIG. 4A, above the holding jaws 312 and 314 and below the extruder head 110, by means of a moving cutter means 321, such as a wire, blade or the like. Typically, the cutter means 320 is maintained at an elevated temperature to aid in passing through and severing the parison 200.

Typically a number of containers 50 are fabricated at one time in a multi-cavity mold assembly. For ease of description, only one mold cavity is illustrated. It is to be realized, however, that the mold assembly 300 may include a plurality of cavities aligned in a row and that a plurality of extruder heads 110 may be provided in a row for extruding a length of parison into each cavity.

The mold assembly 300 is typically mounted on a hydraulically-actuated mold carriage (not illustrated in the simplified schematic FIGS. 3-8) which moves the mold assembly, including the holding jaws 312 and 314, into the proper parison receiving position below the extruder head 110 (FIGS. 3 and 4). The carriage also functions to carry the mold assembly 300, with holding jaws 312 and 314, from the parison receiving position beneath the extruder head 110 to a position displaced from the extruder head 110 where the parison 200 is molded i.e., blown or vacuum-formed, into a container shape, then filled, and finally sealed.

Typically, with reference to FIG. 4A, the mold assembly 300 is moved, by the mold assembly carriage (not illustrated), along with holding jaws 312 and 314, away from the extruder head 110 in a direction normal to the plane of FIG. 4A after the parison 200 has been severed by the cutter 320. The mold carriage typically moves the mold assembly 300 with holding jaws 312 and 314 a distance of about one-half meter to the molding, filling, and sealing station wherein the severed length of parison is molded, filled and sealed as will next be explained.

The molding, filling and sealing station is illustrated in FIG. 5 where the container 50 is illustrated as having been molded and filled with liquid contents 51. Molding can be effected by blowing, vacuum, or a combination of both of the foregoing expedients depending on container size. At this station, a vertically reciprocable composite mandrel 500 is provided along with a vertically reciprocable insert article pick up and placement arm 600.

In addition to being vertically reciprocable, the composite blowing and filling mandrel 500 and the arm 600 are laterally reciprocable. Preferably, in the preferred embodiment, the composite blowing and filling mandrel 500 and the arm 600 are carried on a suitable common structure or carriage (not illustrated in the schematic FIGS. 3-8) for effecting a common lateral reciprocation of the composite mandrel 500 and arm 600.

In any case, with the severed parison properly positioned in the molding, filling, and sealing station, the composite mandrel 500 is in registry (or is moved into registry) with the opening at the upper end of the severed length of the parison. Then the composite mandrel 500 is extended downwardly into the opening of the upper end of the severed length of the parison to seal the parison opening with the mandrel and to press the parison against the first or main mold halves 302 and 304 as illustrated in FIG. 5.

The mandrel 500 preferably includes a conventional blowing tube and a conventional filling tube (neither being visible in FIGS. 5 and 6). The composite mandrel 500 may be of a suitable conventional design such as the mandrels disclosed in the above-discussed U.S. Pat. No. 3,919,374 and/or found in commercial machines that incorporate a single mandrel for molding and filling container.

In operation, compressed gas, such as air or the like, is discharged through the mandrel blowing tube into the interior of the hollow parison to inflate the parison outwardly against the walls of the cavity 306 defined by the first or main mold halves 302 and 304 with or without vacuum assist through small passageways in the molds. The compressed gas is typically discharged for about one second. Next, the filling tube inside the composite mandrel 500 is reciprocated downwardly to open a vent passage in the mandrel 500 to permit venting of the compressed gas out of the molded container. Subsequently, the blowing tube is moved downwardly a small amount within the mandrel 500 to open the product dispensing valve and permit the product to be injected under pressure from the filling tube into the formed container.

The product, typically a liquid, is usually at a relatively lower temperature than the parison and assists in solidifying the walls of the formed container. After the formed container 50 has been filled with the desired amount of product, the composite mandrel 500 is withdrawn from the open end of the parison. If it is desired to form an unfilled container, the filling procedure, of course, is omitted.

When the composite mandrel 500 has been elevated to a position above the holding jaws 312 and 314, the mandrel 500 is moved away from the parison open end while the pick up and placement arm 600 is moved into alignment or registry with the opening at the upper end of the parison. The arm 600 then is extended downwardly into the parison as illustrated in FIG. 6.

The pick up and placement arm 600 functions to perform a secondary operation through the parison top opening on either the molded container body portion per se (located in the main mold halves 302 and 304) or on the remaining length of parison above the closed main mold halves 302 and 304. The arm 600 may function to inject or discharge additional material (solid, liquid or gas) into the container. The arm 600 may also function to position an auxiliary component within the remaining length of parison above the closed main mold halves, which auxiliary component is ultimately incorporated into the container top closure structure.

In the method illustrated in FIGS. 5–8, the arm 600 functions to position the plug or stopper 60 in the parison opening for subsequent partial encapsulation by the parison. The stopper 60 is illustrated as having a particular configuration that includes an upper disc-like portion 62 with an upper beveled edge 61 and a lower beveled edge 63, a lower frustoconical portion 64, and a reduced diameter cylindrical portion 66 joining the disc-like portion 62 with the frustoconical portion 64. In the illustrated embodiment, the stopper 60 has an upper or top surface 68 (FIG. 5) that is generally flat and smooth.

The particular configuration illustrated for the stopper 60 is not essential to the novel method taught herein. The method may be used with stoppers having other shapes.

The stopper 60 is held in a suitable manner by the arm 600. One such suitable manner or means includes the use of vacuum drawn at the bottom end of the arm 600 against which is positioned the upper surface 68 of the plug 60 (FIGS. 5 and 6). The stopper or other insert can also be held by arm 600 using a mechanical retention means such as friction, a snap-fit temporary interlock, or similar means. To this end, the bottom of the pick up arm 600 defines a generally downwardly facing annular pick up surface 604 which contacts the upper surface 68 of the cap 60. The arm 600 defines suitable bores 606 (FIG. 6) which communicate with the pick up surface 604. The bores 606 are connected to a suitable source of vacuum (not illustrated). A reduction in pressure is effected through the bores 606 and the stopper 60 is thus maintained against the bottom of the pick up arm 600 by means of the pressure differential between the reduced pressure in the bores 606 and ambient atmospheric pressure.

As best illustrated in FIG. 6, the arm preferably has an internal cylindrical cavity 602 communicating with the bottom of the member 600. The cavity 602 can function for receiving an upwardly projecting portion of a nozzle or other auxiliary component. An auxiliary component with such an upwardly projecting portion is described hereinafter with reference to a container embodiment illustrated in FIGS. 9–11.

The stopper 60 may be automatically positioned on the end of the pick up arm 600 by suitable apparatus. Although such suitable stopper placement apparatus is not illustrated in the schematic representations of FIGS. 5–8, specific stopper placement apparatus is described hereinafter with reference to FIGS. 15–23.

In any case, the stopper pick up arm 600, carrying the stopper 60, is vertically aligned within the upper opening of the parison adjacent the second or upper sealing mold halves 308 and 310. As can be seen with reference to FIGS. 5 and 6, the sealing mold halves 308 and 310 have a central cavity portion 320 conforming to the exterior shape of the stopper 60. When the sealing mold halves 308 and 310 are ultimately closed, the diameter of the cavity 320, taken at any vertical position along the longitudinal vertical axis of the mold, is slightly larger than the corresponding diameter of the stopper 60 so as to accommodate the parison as necessary during the subsequent sealing step when the mold halves 308 and 310 are closed about the stopper 60.

The second or upper sealing mold halves 308 and 310 are moved from their open position (FIG. 6) to their closed or sealing position (FIG. 7) to compress some of the parison against at least a portion of the stopper 60 to hermetically seal the top of the container 50 to the stopper. The pick up arm 600 is then retracted upwardly to a position above the parison tube and above the gripper holding jaws 312 and 314. If desired, the vacuum effected at the bottom of the pick up arm 600 can be terminated ust before the arm 600 is raised. However, since the cap 60 is tightly engaged by the parison between the closed upper sealing mold halves 308 and 310, continuous maintenance of the vacuum throughout the operation, including during and after retraction of the pick up arm 600, will not prevent proper release of the stopper 60 from the pick up arm 600.

If desired, a knife edge 311 can be provided on the second or upper sealing mold halves 308 and 310 as best illustrated in FIGS. 6 and 7. When the sealing mold halves 308 and 310 are closed against the cap 60, the knife edge 311 becomes positioned relatively near the cylindrical exterior surface of the pick up arm 600. This causes the knife edge 311 to penetrate through a substantial portion of the parison adjacent the top surface 68 of the stopper 60. As a result, the portion of the parison extending upwardly above the stopper 60 is almost but not quite severed from the top of the container 50. Ultimately, the portion of the parison above stopper 60 is completely removed from the container, as by breaking the portion off of the container by hand or with a suitable conventional deflashing apparatus (not illustrated).

After the pick up arm 600 has been raised to an elevated position above the holding jaws 312 and 314, the molds are opened as best illustrated in FIG. 8. Specifically, the first or lower (main) mold halves 302 and 304 are opened. The second or upper sealing mold halves 308 and 310, being carried on the main mold halves, necessarily also move away from the container 50. In addition, the upper sealing mold halves 308 and 310 are independently moved relative to the main mold halves 302 and 304 to the extreme open position illustrated in FIG. 8.

In the preferred embodiment, the holding jaws 312 and 314 are moved together with, or mounted to, the first or main mold halves 302 and 304 (such mounting means not being shown in the schematic representation of FIGS. 5–8). Therefore, in the preferred embodiment, the holding jaws 312 and 314 are moved to the retracted (open) position when the main mold halves 302 and 304 are moved to the opened position as illustrated in FIG. 8.

When the mold assembly 300 is fully open, the formed and filled container is thus free and clear of the mold assembly and may be removed and deflashed by suitable conventional means. Typically, the container 50 would be supported on a pin (not illustrated) encapsulated in the flash 204 at the bottom of the container in a manner well known in the art. The container 50 could then be removed from the mold area on the pin to a suitable conventional deflashing apparatus. During deflashing, the projecting parison flash (at the bottom of the container 50, around the sides of the container, and the upwardly extending portion of the parison above the cap 60) is broken away to provide a deflashed container substantially as illustrated in FIGS. 1, 1A and 2.

In preparation for the next molding cycle, the pick up arm 600 and mandrel 500 are returned to their original positions wherein the mandrel 500 is positioned over the mold assembly center line. In that position, the mandrel 500 can then be extended downwardly into the parison in the mold assembly after the mold assembly has been moved to the extruder and then returned, with a new length of parison, to the molding, filling and sealing station.

The Container: Second Embodiment

An alternate embodiment of a container is illustrated in FIGS. 9 and 10 wherein it is designated generally by reference numeral 50'. The container 50' has a generally cylindrical, hollow body portion 52' substantially similar to the body 52 of the first embodiment of the container 50 illustrated in FIGS. 1–2. Similarly, the container 50' has a top closure structure 58' in which is mounted an auxiliary component that, in this case, is a nozzle assembly 70 (FIG. 10) which is covered with a cap 75. The nozzle assembly 70 includes a dispensing tip or nozzle 72 defining a centrally disposed dispensing aperture 74. The nozzle assembly 70 has a base comprising an upper cylindrical portion 76, a lower reduced diameter cylindrical portion 78, and a frustoconical portion 80 joining the upper portion 76 to the lower portion 78 having a cylindrical side surface. The upper portion 76 of the base has a beveled edge 83 merging with an upwardly facing annular flat surface which surrounds a nozzle 72. The base lower portion 78 also includes a beveled edge 82.

As best illustrated in FIG. 10, the thermoplastic material of the closure structure 58' surrounds the base portion of the nozzle assembly 70. In particular, the closure structure 58' sealingly encapsulates the nozzle base and is sealingly engaged with a portion of the lower beveled edge bearing surface 82, the frustoconical portion 80, the upper portion 76, and the upper beveled edge 80.

The closure structure 58' has an upwardly slanting support wall 59 upon which the nozzle base is positioned. This support wall 59 can also serve as the sealing region against which the blowing and filling mandrel (such as mandrel 500 illustrated in FIG. 5) is positioned when forming and filling the container according to the general method described above. After the container has been filled, mandrel is retracted upwardly away from the sealing wall 59 and the nozzle assembly 70 is placed by suitable means (e.g., a pick up arm, such as the arm 600 illustrated in FIG. 6 and described above). When the nozzle assembly 70 is properly positioned with the bottom beveled edge bearing surface 82 against the closure structure wall 59, the closure structure support 58' is formed around the nozzle assembly by suitable sealing means so as to form the configuration illustrated in FIG. 10.

With reference to FIG. 10, it can be seen that a void or cavity 84 is provided around the circumference of the nozzle lower base portion 78. During the blowing and filling steps, the portion of the closure structure 58' adjacent the cavity 84 is next to the blowing and filling mandrel (such as mandrel 500 illustrated in FIG. 5).

When the parison is molded to form the closure structure 58' around the nozzle assembly 70 of the container illustrated in FIGS. 9 and 10, the parison that forms the support wall 58' and that forms the lower part of the closure structure around the cavity 84 is not forced or molded inwardly against the nozzle assembly 70. Only the upper portion of the closure structure 58', the portion extending from the nozzle frustoconical portion 80 to the nozzle upper beveled edge 83, is compressed inwardly and molded around the nozzle assembly 70 as illustrated in FIG. 10. This results in the cavity 84 around the circumference of the nozzle assembly lower base portion 78.

The closure structure 58' may be formed by a suitable upper sealing mold mounted above the lower or main mold halves for forming the container body 52'. The upper sealing molds would function in substantially the manner described above for the upper sealing mold halves 308 and 310 with reference to FIGS. 5–8. The internal cavity configuration of the sealing molds for forming the closure structure 58' would, of course, be different than the internal cavity configuration of the upper sealing mold halves 308 and 310 and would have a configuration corresponding to the exterior shape of the closure structure 58'.

If a pick up arm is used to position the nozzle assembly 70 in the mold assembly, the upwardly extending nozzle 72 must be accommodated by the pick up arm. To this end, a pick up arm identical to the pick up arm 600 described above with reference to FIG. 6 can be used. The nozzle 72 is received within the cylindrical cavity 602 of the pick up arm 600 and the downwardly facing annular pick up surface 604 engages the top of the nozzle assembly base portion 76 to hold the nozzle assembly 70 by means of vacuum.

A snap-on overcap 75 is provided to cover the nozzle 72. To this end, the novel nozzle 72 includes an annular ridge 77 and the overcap 75 includes an inwardly projecting annular ridge 79. The overcap 75 is made from suitably resilient material to allow the cap to deflect outwardly a slight amount as the cap ridge 79 is pushed over the nozzle ridge 77 and to then deflect back inwardly whereby the cap 75 is retained on the nozzle 72 and whereby the cap 75 may be removed when desired by pulling the cap upwardly with a force sufficient to cause the cap ridge 79 to be disengaged from the nozzle ridge 77. The cap 75 can be placed on the nozzle 72 after the nozzle 72 is mounted and molded into the container 50'. On the other hand, if the pick up arm 60 has a large enough cavity 602, the nozzle assembly 70 can be preassembled and partially encapsulated with the cap 75 already in place.

FIG. 11 illustrates the container 50' with an alternate form of the nozzle assembly wherein the alternate nozzle assembly is designated generally by reference numeral 70'. The nozzle assembly 70' has a tip or nozzle 72' and a base comprising a cylindrical upper portion 76', a frustoconical portion 80' and a reduced diameter cylindrical portion 78'. The nozzle 72' includes a conventional thread 86 onto which a cap 75' may be screwed. To this end, the cap 75' includes a suitable mating thread structure 87'.

When the cap 75' is screwed onto the nozzle 72' or unscrewed from the nozzle 72', a torque will be transmitted to the nozzle 72' which will tend to rotate the nozzle assembly 70 within the closure structure 58 of the container 50'. To prevent the nozzle assembly 70 from loosening or rotating within the closure structure 58' and to otherwise provide an even more secure engagement and sealing encapsulation of the nozzle assembly 70', the nozzle assembly base upper portion 76' is provided with a plurality of circumferentially spaced, outwardly projecting vertical ridges 88. The ridges 88 are surrounded by the thermoplastic material of the closure structure 58' and resist the torque transmitted to the nozzle assembly 70' during overcap placement or removal operations.

The same objective of providing increased torque resistance in the nozzle assembly 70' can be achieved by incorporating grooves (not illustrated) in place of the ridges 88 in the nozzle assembly base upper portion 76'. In such an event the grooves are filled with the thermoplastic material comprising the closure structure 58' and this serves to resist the torque loads.

The Container: Third Embodiment

A third embodiment of the container is illustrated in FIG. 12 and designated generally therein by reference numeral 50". The container includes a body portion 52" and a closure structure 58". As with the first embodiment of the container 50 discussed above with reference to FIGS. 1-2, the container 50" is preferably fabricated from conventional thermoplastic molding materials such as polyethylene and the like.

The container 50" is substantially identical to the container 50 illustrated in FIGS. 1-2 except that the top of the closure structure 58" is sealed over the insert article or stopper and has a means by which the sealed portion may be broken to permit access to the stopper. In particular, at the top of the closure structure 58" there is a hollow cap structure 92 that is joined to the lower portion of the closure structure 58" by means of frangible web or a reduced thickness portion 94 of the molded thermoplastic material. The top of the cap portion 92 terminates in a generally flat tab 96.

When it is desired to gain access to the contents of the container 50", the outwardly extending tab 96 is grasped and a force is applied to break the frangible web 94 whereby the cap 92 can be removed from the container 50". Access is thus provided to the top of the insert article, such as stopper 60. The remaining portion of the closure structure 58" may be peeled away from the stopper 60 or the stopper 60 may be pierced by a cannula or other device as desired.

FIGS. 13 and 14 schematically illustrate the manner in which the container 50" of FIG. 12 may be fabricated. In particular, the container 50" is initially formed and filled in the manner identical to that for forming and filling the first embodiment of the container 50 described above with reference to FIGS. 3-8. To this end, the lower or main sealing mold halves 302 and 304 are provided along with the gripper holding jaws 312 and 314.

Second or upper mold halves 308" and 310" are provided above the main mold halves 302 and 304. The upper sealing mold halves 308" and 310" are similar to the sealing mold halves 308 and 310 described above with reference to FIGS. 3-8. The upper sealing mold halves 308" and 310" have an internal configuration generally corresponding to the exterior configuration of the stopper 60. In addition, the upper sealing mold halves 308" and 310" have a frangible web-forming member 311" in place of the knife edge 311 on the sealing mold halves 308 and 310. The frangible web-forming means 311" functions to form the frangible web in the parison around the top of the insert or stopper 60. To this end, the upper sealing molds 308" and 310" cooperate with the exterior cylindrical surface of the pick up arm 600 to form the parison and the frangible web to predetermined thicknesses. Thus, the exterior surface of the pick up arm 600 functions as an anvil against which the formation of the parison into the frangible web is effected by means of the frangible web-forming means 311 on the upper sealing mold halves 308" and 310".

The configuration of the forming means 311" on the upper sealing mold halves 308" and 310" is designed to provide, for a given closure structure diameter and wall thickness, the desired frangible web thickness so that the frangible web will maintain the necessary structural integrity during normal handling of the sealed container 50" and so that the frangible web can be broken when sufficient force is applied to the tab 96 (FIG. 12).

In addition to the modified upper sealing mold halves 308" and 310", the mold assembly for molding the modified container 50" includes a third mold means or pair of third mold halves 340 and 342. Like the pair of second sealing mold halves 308" and 310", the third mold halves 340 and 342 can be carried on the first or main mold halves 302 and 304 for movement with the main mold halves 302 and 304 between the main mold open position and the main mold closed position (illustrated in FIGS. 13 and 14). In addition, the third mold halves 340 and 342 are movable relative to both the main mold halves 302 and 304 and to the second mold halves 308" and 310". Specifically, the third mold halves 340 and 342 are movable between the retracted position illustrated in FIG. 13 and the closed or sealing position illustrated in FIG. 14.

As illustrated in FIG. 13, when the stopper 60 is positioned between the second mold halves 308" and 310", the second mold halves 308" and 310" are closed to partially encapsulate the stopper 60. The frangible web is formed by the forming means 311" coacting with the cylindrical exterior anvil surface of the pick up arm 600. Subsequently, the pick up arm 600 is withdrawn out of the parison opening and is moved to a position elevated above the gripper holding jaws 312 and 314. Then, as best illustrated in FIG. 14, the third mold halves 340 and 342 are moved to the fully closed position to form (1) the cap 92 and sealed cavity above the stopper 60 and (2) the tab 96 extending above the cap 92.

Finally, the first or main mold halves 302 and 304 are moved to the open position and carry with them the second mold halves 308" and 310", the third mold halves 340 and 342' and the gripper jaws 312 and 314. The second mold halves 308" and 310" and the third mold halves 340 and 342 are also further moved relative to the lower or first mold halves 302 and 304 to their fully retracted positions. The formed container 50", now clear of the mold assembly, can be moved to suitable apparatus for deflashing.

Apparatus for Making the Container

An apparatus for forming, filling, and sealing a container in accordance with the teachings of the present invention is illustrated in a simplified diagram in FIG. 15. The various mechanisms included in the apparatus, and the cooperative operations of such mechanisms, are illustrated in more detail in FIGS. 16–23.

For ease of understanding, the apparatus will be generally described with reference to the previously discussed method for forming, filling, and sealing a container (including the step of performing a secondary operation at the top opening of the container before it is sealed) as illustrated in FIGS. 3–8. Mechanisms of the apparatus corresponding to those shown in the schematic illustrations of FIGS. 3–8 are designated in FIGS. 15–23 with the same reference numerals.

Many of the figures illustrating the preferred embodiment of the apparatus show structural details and mechanical elements that will be recognized by one skilled in the art. However, the detailed descriptions of such elements are not necessary to an understanding of the invention, and accordingly, are not herein presented.

The apparatus illustrated in simplified form in the diagram of FIG. 15 includes a number of conventional mechanisms and assemblies and may be regarded as a modification of an existing molding, filling, and sealing machines sold by Automatic Liquid Packaging, Inc., 2445 East Oakton Street, Arlington Heights, Ill. 60005, U.S.A., e.g., those available under the designations Model 301/303/305 Bottle Pack machine.

A number of the major mechanisms of the machine are generally similar to the apparatus disclosed in U.S. Pat. No. Re. 27,155 to Hansen and the method of operation of the machine is generally similar to the method described in that patent. The description of the method and apparatus disclosed in the U.S. Pat. No. Re. 27,155 is incorporated herein by reference to the extent pertinent and to the extent not inconsistent herewith.

In this description, only such portions of the mechanisms that are disclosed in the U.S. Pat. No. Re. 27,155 and/or are present in the above-identified Bottle-Pack machines as are relevant to the present invention have been illustrated in detail, those portions being described only in sufficient detail herein so as to afford an understanding of their relation to the teachings of the present invention.

With reference to FIG. 15, the apparatus includes a mold assembly 300 which is shown in an open position beneath an extruder head manifold 109. The extruder manifold 109 is part of a conventional multi-head extruder having various conventional mechanisms which, except for the conventional hopper 301, are not shown in FIG. 15 in order to simplify the illustration.

The extruder manifold 109 supplies thermoplastic molding material to four extruder heads 110. Each extruder head 110 is identical to, and functions in the same manner as, the extruder head 110 described above with reference to the schematic illustration in FIGS. 3–8. Each extruder head 110 simultaneously extrudes a length of parison downwardly into the mold assembly 300. Thus, four articles, such as the containers 50 described above with reference to FIGS. 1–2, can be fabricated simultaneously.

In FIG. 15, the pair of holding gripper jaws 312 and 314 at the top of the mold assembly 300 are visible. The gripper jaws 312 and 314 include four spaced-apart pairs of opposing concave regions 315 generally aligned with the four extruder heads 110 for gripping the extruded lengths of parison.

Also shown with the extruder head manifold 109 in FIG. 15 is a cutter blade or wire 321 which is movable by suitable conventional mechanisms (not illustrated) beneath the extruder heads 110 to sever the extruded lengths of parison from the extruder heads after the mold assembly 300 has closed about the parison in the manner described above in detail with reference to FIGS. 3–8.

As illustrated in FIG. 17, the mold assembly 300 includes the upper sealing mold halves 308 and 310 (schematically illustrated in FIG. 3–8) and the first or main mold halves 302 and 304 (schematically illustrated in FIGS. 3–8) which are mounted to support plates 306. The entire mold assembly is mounted to a mold carriage 303 which is reciprocable on a guide or frame assembly 305 between (1) a parison extruding or receiving station defined beneath the extruder head manifold 109 and (2) a molding, filling and sealing station (that is typically located about one-half meter forward as illustrated in dashed line in FIG. 15) by means of a suitable drive mechanism such as a hydraulic piston and cylinder actuator 307. In FIG. 15, the mold assembly 300 is illustrated in dashed lines in closed position at the molding, filling and sealing station. The two halves of the mold assembly 300 are moved on support rods 317 (FIG. 17) between the open and closed position relative to the mold carriage 303 by means of suitable actuators, such as hydraulic piston and cylinder actuators 309. The upper sealing mold halves 308 and 310 are moved relative to the main mold halves 302 and 304 by means of piston and cylinder actuators 319 (FIG. 17) between a closed sealing position and an open position.

The extruder, the mold assembly carriage, the support frame and guides, and actuators are all conventional and may be of the type found in the above-discussed Bottle-Pack machines.

An auxiliary component feeder, such as a stopper feeder 700 is provided forward of the parison extruding station adjacent the blow molding, filling and sealing station as best illustrated in FIGS. 15 and 19. The stopper feeder 700 is adapted to feed stopper 16 described above in detail with reference to FIGS. 1–8.

The stopper feeder 700 may be of any suitable type, such as the conventional spiral-shelf hopper feeder having a threaded wall and a flat circular bottom which rotates relative to the threaded wall. Rotation of the bottom causes the stoppers 60 to travel up the threads of the wall and out of the feeder 700. A track 702 is provided as best illustrated in FIGS. 15, 16, and 19 to guide the stoppers 60 from the top of the feeder 700 serially to a predetermined position or stopper loading station forward of the blow molding, filling, and sealing station. As best illustrated in FIGS. 16 and 19, the track 702 includes a pair of spaced apart guide rails 704 between which is received the decreased diameter portion 66 of the stopper 60 (the stopper configuration being shown in greatest detail in FIG. 5).

As best illustrated in FIGS. 15, 16, and 19, a transfer means 720 is provided for (1) receiving four stoppers 60 from the track 702 of the feeder 700 at the predetermined position at the end of the track 702 and (2) for carrying the stoppers 60 inwardly to the molding, filling and sealing station. Specifically, the transfer means 720 includes an escapement bar 722 defining four spaced-apart notches 724. The escapement bar 722 is mounted for reciprocation on guide rod 726. A fluid-driven cylinder and piston actuator 728 is provided with a piston rod 730 connected to one end of the escapement bar 722 for effecting the reciprocation of the escapement bar 722 along the rod 726. Other reciprocating means can also be used to drive bar 722.

As best illustrated in FIG. 19, the escapement bar notches 724 each have an inwardly slanting straight portion that merges with a curved portion such that, as the escapement bar 722 is moved inwardly towards the blow molding station (toward the top of the drawing in FIG. 19), one stopper 60 is urged into each notch 724. On the other hand, when the empty escapement bar 722 is reciprocated back from the molding station to the stopper loading station (the orientation illustrated in FIG. 19), stoppers 60 in the track 702 will be urged by the slanting portion of each notch to remain in the track 702. Consequently, no stoppers 60 will be discharged from the track 702 on the return stroke of the escapement bar 722.

As best illustrated in FIGS. 16 and 18, the blow molding, filling and sealing station includes a tower assembly 800 that carries four blowing and filling mandrels 500 and four stopper pick up and placement arms 600. The blowing and filling mandrels 500 and the pick up arms 600 are each supported on the tower assembly 800 in a manner that permits them to be moved together, or separately if desired, between predetermined elevations.

The tower assembly 800 includes support rods, guide rods, and various actuator systems for effecting the vertical movement of the blowing and filling mandrels 500. The structure and mechanisms of the tower assembly 800 that are relevant to the operation of the mandrels 500 are conventional, are well known in the art, and can be the same general type as those present in the above-identified commercial Bottle-Pack machines discussed above.

The tower assembly 800 includes a pair of main support shafts 802 secured to a mounting plate 804. In FIG. 16 only one shaft 802 is visible and the second shaft stands in line behind the one visible shaft 802. On the side of the tower assembly 800 opposite the support shafts 802 are a pair of shorter support posts 646. The mandrels 500 each include an outer nozzle 501 secured beneath the tower assembly to a support plate 806 mounted to a pair of actuatable guide rods 808 which are slidably disposed in bushings 810 that are fixed to the mounting plate 804.

Movable filling tubes 832 extend in sliding engagement through the nozzles 501. Liquid product is supplied to the filling tubes 832 by conventional means (not illustrated). The blowing tubes 829 extend to the nozzles 501 within the filling tubes 832. (FIG. 16).

With reference to FIG. 16, when the mold assembly 300 is moved forward from the parison receiving station at the extruder heads to the blowing, filling and sealing station, the mold cavities that are defined between the mold halves become positioned beneath the mandrels 500. Next, the mandrels 500 are moved downwardly so that the mandrels 500 are in sealing engagement with the parison at the mold opening. When the mandrels 500 are properly sealingly engaged with the parison in the mold assembly 300, a blowing air manifold is actuated by suitable controls to discharge air down blowing tube 829 within each filling tube 832 and nozzle 501 (for a blowing period of typically about one second) to mold the containers within the mold assembly 300.

Next, the filling tubes 832 are moved downwardly relative to the mandrel nozzles 501 to open an air vent passage (not illustrated) within the nozzles 501 to permit venting of the compressed air from the molded containers 50.

Finally, the blowing tubes 829 are moved downwardly about one-half inch to permit the product to pass out of the annular space between each filling tube 832 and the associated inner blowing tube 829 and into the container. Thereafter, the mandrels 500 are retracted to the elevated positions above the mold assembly 300 as shown in FIG. 16.

The tower assembly 800 also includes mechanisms for picking up the stoppers 60, for moving the stoppers 60 over the mold assembly 300 with a molded container therein, and for placing the stoppers 60 within the molded containers where they can be sealed in place in the container openings by suitable sealing molds. Specifically, with reference to FIGS. 16 and 18, the four stopper pick up and placement arms 600 are mounted to a vacuum manifold 630 which is secured to the lower ends of a pair of guide rods 632 which are slidably guided by the pair of bushings 634 secured to the mounting plate 804. The guide rods 632 are secured at their top ends to a support plate 636. A piston rod 638 of a cylinder actuator 640 is connected to the mounting plate 636. The cylinder portion of the actuator 640 is mounted to a support plate 642 which is secured to a pair of bushings 644 that are slidably disposed on the pair of support posts 646.

Actuator means 650 is provided with a piston rod 652 which is secured to a rod end mounting block 654 secured to the plate 642. The piston rod of the cylinder actuator 650 can be adjusted as desired to control the stroke of the actuator 650 which in turn controls the depth of placement of the stopper by the placement arms 600. The operation of the above-described pick up arm actuator system will next be described.

Stoppers 60 are presented by the escapement bar 722 beneath the pick up and placement arms 600 as illustrated in FIG. 16. The pneumatic cylinder actuator 640 is then operated to move the manifold 630 downwardly about one-half inch to engage the stoppers 60 with the arms 600. As explained above with reference to FIGS. 6 and 7, the pick up and placement arms 600 have bores communicating with the end of the arms through which vacuum is drawn and by means of which the stoppers are held to the ends of the arms 600. Thus, the arms 600 can be moved to carry the stoppers 60 out of the escapement bar notches (FIG. 16). The arms 600, carrying the stoppers, are moved (to the right as viewed in FIG. 16) into position over the mold assembly 300. A novel mechanism is provided for effecting this movement, as will next be explained.

The tower assembly mounting plate 804 is secured to a carriage or base plates 900 as best illustrated in FIG. 18. The base plates 900 are secured to a pair of bearing races 902 which are part of a linear bearing set having fixed bearing races 904. Roller bearings in a suitable retainer structure 906 are provided between the races 902 and 904. The fixed bearing races 904 are supported on a suitable pair of frame members 905 which are part of the apparatus main frame structure. Tower assembly 800 is thus capable of transverse horizontal movement relative to the stopper transfer means 720 and mold assembly 300 (to the left or right as viewed in FIG. 16).

The movement of the tower assembly 800 is effected via a pneumatic cylinder actuator 920 (FIG. 16) which is mounted to a suitable frame structure 922 on the apparatus and which has a piston 924 connected to a bracket 926 depending downwardly from one of the base plates 900. Thus, after the stopper pick up and placement arms 600 have been engaged with the four stoppers 60 on the escapement bar 722, the cylinder actuator 920 is operated to move the carriage or base plates 900 (and the tower assembly 800 thereon) so as to position the stoppers over the mold assembly 300. To accurately control the distance which the carriage or base plates 900 are moved with the tower assembly 800, a stop 930 can be provided on the frame 905 as illustrated in FIG. 16.

Next, actuator means 650 on the tower 800 is operated to lower the stopper placement arms 600 even further so as to locate the stoppers 60 within the openings of the upwardly extending parison portions in the mold assembly 300 as described above and as illustrated in FIG. 6.

Next, with the stoppers 60 properly located in the mold assembly 300, the upper or second sealing mold halves 308 and 310 are closed about the parison lengths and stoppers 60 in the manner described above with reference to FIGS. 6–8. FIG. 17 illustrates the position of the apparatus when the upper sealing mold halves 308 and 310 of the mold assembly 300 are closed to seal the parison lengths about the stoppers 60.

Finally, the mandrels 600 are fully retracted and the mold assembly 300 opened so as to permit the containers to be removed and/or conveyed out of the mold assembly by a suitable conventional apparatus (not illustrated).

To control the placement of the stoppers in the mold assembly by the placement arms 600, a proximity switch 670 is mounted with a suitable bracket 672 to an upstanding rod 674 secured to the mounting plate 804. The proximity switch 670 is actuated when the support plate 636 is lowered to the elevation of the proximity switch 670. Similarly, the return of the placement arm 600 to the desired elevated position (about one-half inch higher than the stoppers in the escapement bar 722) is controlled by a proximity switch 676 mounted with a suitable bracket 678 to the rod 674. When the support plate 636 is returned to the level of the proximity switch 676, the operation of the actuator means 650 is terminated.

Other limit switches and controls are provided as necessary, including electrical, electronic, and pneumatic controls, for effecting the various operations of the apparatus mechanisms in the manner described above. Such other controls are conventional and well known to those skilled in the art and having an understanding of the necessary functions of the mechanisms. Consequently, such conventional controls are not described in further detail.

Although the apparatus is illustrated as incorporating stopper pick up and placement arms 600, it is to be realized that other mechanisms may be provided in place of the arms 600. Such mechanisms would function to effect a secondary operation on the containers, the container openings, and/or on the upwardly extending portions of parison around the container openings.

Such secondary operations could include the positioning various types of inserts within the container openings. Such inserts could include nozzles and other metal or plastic articles. In addition, other secondary operations could include the discharge of additives (e.g., solid or particulate matter, liquids and gases) into the containers after the blowing and filling mandrels 500 are removed from the containers.

In addition, secondary operations could include placement of an anvil or other forming device within a container opening to, either alone or in conjunction with exterior sealing molds, form particular configurations in the parison at the top of the container.

Figure 20:
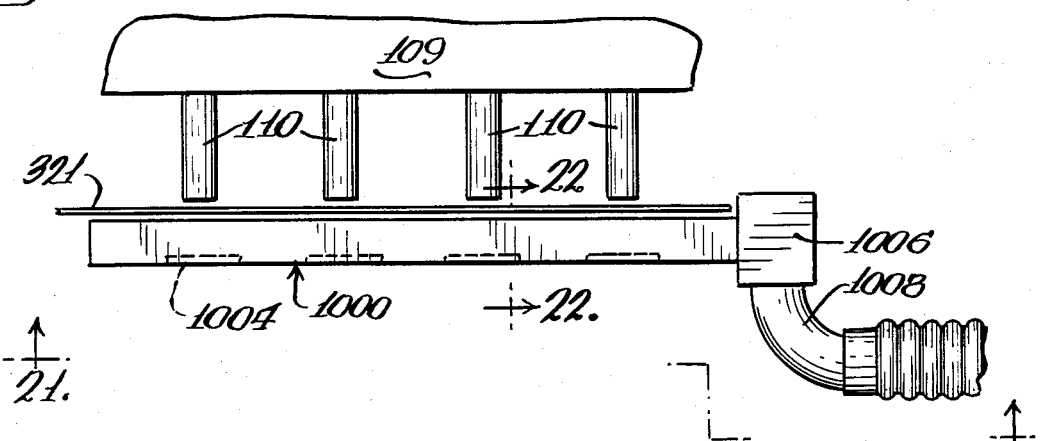
FIG. 20 is an enlarged, fragmentary, cross-sectional view taken along the plane 20—20 in FIG. 15 with portions of the structure eliminated for clarity.
Figure 21:
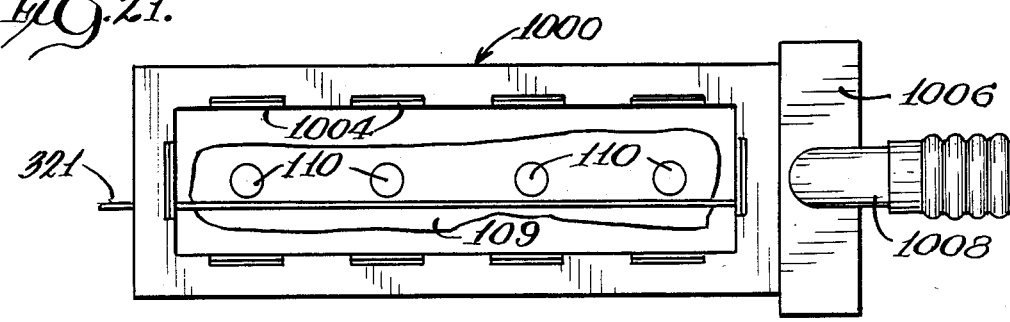
FIG. 21 is a view taken generally along planes 21—21 in FIG. 20.
Figure 22:
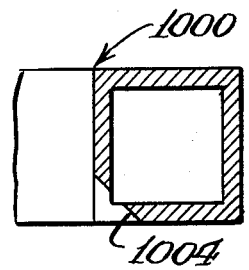
FIG. 22 is an enlarged, cross-sectional view taken generally along the plane 22—22 in FIG. 20.

FIGS. 20–22 illustrate another feature of the method and apparatus for forming the container. Specifically, means are provided for removing fumes and particulate matter generated when the extruded length of parison is severed below the extruder head.

FIG. 20 illustrates the parison receiving station of the apparatus with the extruder heads 110 depending downwardly from the extruder discharge manifold 109. In conventional operation of the apparatus, the lengths of parison are extruded from the extruder heads 110 and, after the lengths of parison are enclosed within the mold assembly (not shown in FIGS. 20–22), a hot wire or blade 321 is moved beneath the extruder heads 110 to sever the extruded lengths of parison.

The severing of the parison with a hot severing device can generate fumes and/or particulate matter which are undesirable, especially when molding, filling and sealing containers under sterile conditions, such as pharmaceutical products. In order to substantially eliminate the likelihood of fumes and particulate matter contaminating the container contents, a novel particulate matter removal system is provided.

In a preferred form, the particulate matter removal system includes a conduit 1000 as best illustrated in FIGS. 20–22. The conduit has a generally square cross section as illustrated in FIG. 22. The conduit 1000 is preferably formed into a rectangular channel or toroidal configuration below and around the extruder heads 110. At the bottom inside edge of the conduit 1000, a plurality of apertures or slits 1004 are provided. These apertures can be conveniently formed in the conduit as illustrated in FIG. 22 by removing a corner of the conduit 1000 at spaced locations along the conduit.

The conduit 1000 is connected with a header 1006 which is in turn connected to a larger discharge pipe 1008. The discharge pipe 1008 is connected to a suitable vacuum system or blower (not illustrated) for reducing the pressure within the conduit 1000 whereby ambient atmosphere, laden with fumes and particulate matter, is drawn into the conduit for ultimate discharge a location removed from the molding apparatus.

Figure 23:
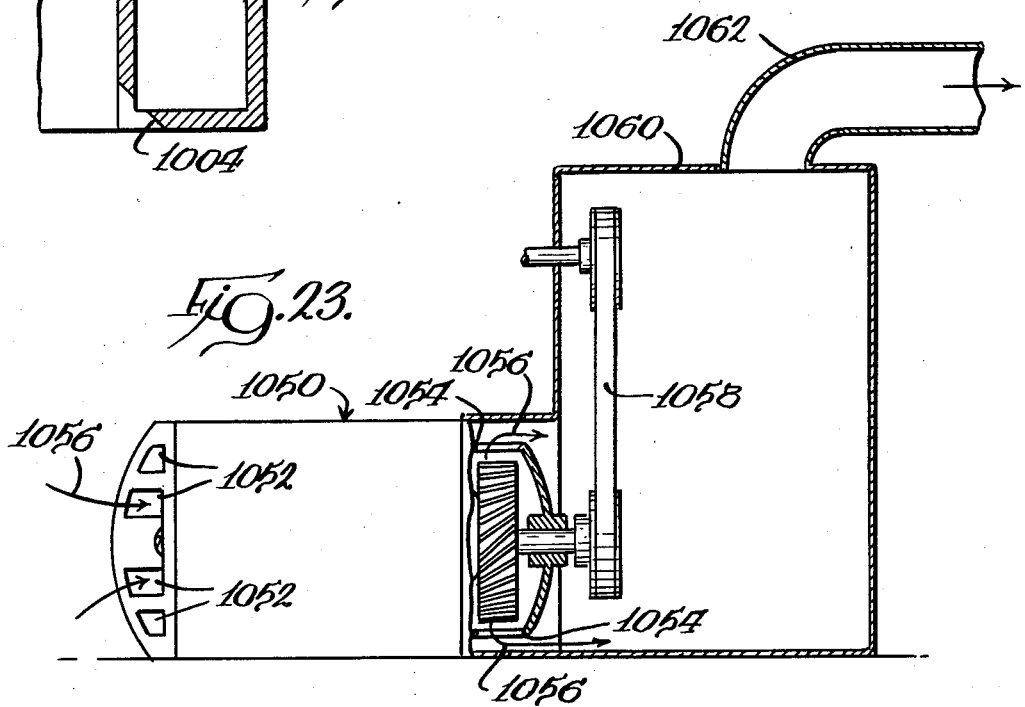
FIG. 23 is a schematic cross-sectional view of a novel housing structure around a portion of a typical extruder motor.

FIG. 23 illustrates an additional means for preventing undesirable contamination of the molding, filling and sealing station and apparatus by particulate matter generated from drive belts and/or carbon brushes of the extruder motor. An extruder motor 1050 of conventional design has a conventional housing defining cooling air inlet vents 1052 and air outlet vents 1054 at the other end. Air is normally pulled through the motor 1050 as indicated by the flow arrows 1056. This air exhausting from the motor 1050 can contain particulate matter from the motor brushes (not visible in FIG. 23) and from the drive belts 1058. This particulate matter is undesirable when forming and filling containers with a sterile product.

Accordingly, the air discharging from the motor 1050 is contained within an additional housing or enclosure 1060 which also encloses the drive belt 1058. A conduit 1062 communicates with the housing 1060 and is connected to a suitable vacuum system or blower (not illustrated) for reducing the pressure within the enclosure 1060 and conduit 1062 whereby the air discharging from the motor 1050 is directed into the conduit 1062 and to an exhaust location sufficiently far from the molding apparatus to prevent contamination. Alternatively, the conduit 1062 may discharge to a suitable filter or air cleaning system so that the filtered or cleaned air can be recycled.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a method for forming an upright container from an extruded length of parison in the form of a vertically oriented, elongated, hollow tube positioned in a closed main mold while maintaining an opening at the top of the remaining length of parison above the closed mold for accommodating an inserted blowing and filling assembly by which the container is molded and filled, for thereafter removing said blowing and filling assembly from said parison top opening, and for then sealing the top of the molded and filled container;
the improvement in the method characterized in that, after said blowing and filling assembly is removed from said parison top opening and before said container top is sealed, the following additional steps are effected:
(A) temporarily continuing to maintain said top opening in said parison to provide access to the interior of said container; and
(B) during step (A) and prior to sealing the container top, performing a secondary operation at the parison top opening by effecting at least one step selected from the following group of steps: (i) introducing an auxiliary component in said parison top opening, (ii) introducing an additive through said top opening into said container, and (iii) introducing a forming device within said parison top opening.

2. The method improvement in accordance with claim 1 in which said secondary operation of improvement step (B) is performed after the step of filling the molded container and includes placing said auxiliary component within said remaining length of parison above the closed main mold and in which said step of sealing the top of the molded and filled container includes the improvement step of compressing at least some of said remaining length of parison around at least a portion of said auxiliary component.

3. The method improvement in accordance with claim 1 in which said blowing and filling assembly is mounted on a carriage; in which a secondary operating means is mounted on said carriage for effecting said secondary operation; and in which both the step of removing said blowing and filling assembly and the improvement step (B) are effected together and include moving said carriage from a first position wherein said blowing and filling assembly is aligned with said parison top opening to a second position in which said secondary operating means is aligned with said parison top opening.

4. In a method for molding, top filling, and sealing an upright container to provide a sterile product within the sealed container wherein the method includes the steps of (a) providing an extruded length of parison in the form of a vertically oriented, elongated, hollow tube; (b) providing and closing a main mold assembly around a portion of said length of parison while gripping a portion of said parison extending upwardly above the closed main mold assembly to maintain an opening at the top of the length of parison; (c) providing and extending a blowing and filling assembly partially into said length of parison through said parison top opening while sealingly engaging the inner surface of said parison with said blowing and filling assembly; (d) discharging pressurized gas into said parison from said blowing and filling assembly to mold the container in the closed main mold assembly, (e) dispensing a product from said blowing and filling assembly into the molded container; (f) retracting said blowing and filling assembly from said parison top opening; and (g) subsequently sealing the top of the molded and filled container with a sealing mold assembly;
the improvement in the method characterized in that, before said container top is sealed in step (g), the following additional steps are effected:
(A) temporarily continuing to maintain said top opening in said parison to provide access to the interior of said container; and
(B) during step (A) and prior to sealing the container top, performing a secondary operation at the parison top opening by disposing in said parison top opening a secondary operating means for functioning to effect at least one step selected from the following group of steps: (i) introducing an auxiliary component in said parison top opening, (ii) introducing an additive through said top opening into said container, and (iii) introducing a forming device within said parison top opening.

5. The method improvement in accordance with claim 4 in which said blowing and filling assembly and said secondary operating means are mounted together on a single carriage and in which the improvement step (B) is effected by moving said carriage from a first position wherein the blowing and filling assembly is aligned with said parison top opening to a second position wherein said secondary operating means is aligned with said parison top opening.

6. The method improvement in accordance with claim 4 in which said secondary operation of the improvement step (B) includes positioning said auxiliary component within said hollow tube of parison at the top of said molded container and in which said step (g) of sealing said container includes the improvement step of compressing a peripheral region of the parison against at least a portion of the auxiliary component to hermetically seal the top of the container to the auxiliary component.

7. The method improvement in accordance with claim 6 in which said improvement of step (g) also includes forming a frangible web above the auxiliary component whereby the parison above said frangible web may be grasped to break the frangible web to provide access to said auxiliary component.

8. The method improvement in accordance with claim 6 in which said secondary operating means includes a generally cylindrical member and in which said improvement of step (g) includes compressing a peripheral region of the parison against said generally cylindrical member to form a generally circular frangible web above said auxiliary component and then removing said cylindrical member and compressing said parison together at a distance spaced above said frangible web to form a hollow cavity above said auxiliary component and to form an upwardly extending tab which may be grasped and to which force may be applied for breaking the frangible web to provide access to said auxiliary component.

9. A method of molding, top filling, and sealing a container in an apparatus to provide a sterile product within the sealed container and to mold an auxiliary component as an integral part of the top of the container, all in a continuous operation wherein the apparatus includes:
- (a) a split mold assembly having two coacting first or main mold halves defining a first cavity for the container body and two coacting second or upper sealing mold halves above said two first mold halves defining a second cavity communicating with said first cavity for receiving therein said auxiliary component and molding it into the top of said container;
- (b) a pair of vacuum operable holding jaws having an inner surface for gripping parison; and
- (c) a blowing and filling assembly for sealingly engaging said parison, for subsequently discharging pressurized gas into said parison for blow molding the container, and for subsequently dispensing a product into the molded container;

the method comprising the steps of:
- (A) opening said first and second mold halves;
- (B) extruding a parison in the form of an elongated hollow tube vertically between said first and second mold halves to extend below and above said first and second mold halves;
- (C) gripping with said vacuum operable jaws the upper portion of the parison by a reduced pressure effected between the outer surface of the parison and said inner surface of said jaws to maintain an opening in the upper portion of said parison above said second mold halves;
- (D) closing said first mold halves about said parison to confine a portion of said parison therebetween while maintaining an opening in the upper portion of said parison with said holding jaws;
- (E) severing said parison above said holding jaws to provide a top opening at the end of the upper portion of the severed length of parison adapted to receive in seriatim said blowing and filling assembly and said auxiliary component;
- (F) extending said blowing and filling assembly through said top opening at the end of the upper portion of the severed length of parison to seal said top opening with the assembly pressing the parison against the first mold halves;
- (G) blowing gas into said parison from said blowing and filling assembly to mold said container;
- (H) venting said molded container;
- (I) discharging a product into said molded container from said blowing and filling assembly to fill said container;
- (J) retracting said blowing and filling assembly from said top opening of said parison;
- (K) positioning said auxiliary component within said parison top opening adjacent said second mold halves;
- (L) closing said second mold halves about both said auxiliary component and the surrounding parison to compress the parison between the exterior surfaces of the auxiliary component and the interior surfaces of said second mold halves to hermetically seal the formed and filled container about at least a portion of the auxiliary component; and
- (M) opening said first and second mold halves to expose the formed, filled, and hermetically sealed container with the auxiliary component integrally molded therewith.

10. The method improvement in accordance with claim 9 wherein the apparatus further includes two coacting third mold halves above said two second mold halves;
in which step (K) includes holding said auxiliary component at the bottom of a cylindrical arm;
in which said method includes a further step, after step (L) and before step (M), of withdrawing said cylindrical arm and closing said third mold halves about said parison above said frangible web to seal said parison so as to form a sealed cavity above said auxiliary component and so as to form a tab extending above said cavity which may be grasped and to which force may be subsequently applied to break said frangible web so as to provide access to said auxiliary component.

11. In an apparatus for molding an upright container from an extruded length of parison in the form of a vertically oriented, elongated, hollow tube, said apparatus having (1) a first or main mold means for forming the container body with an open top, (2) gripping means for maintaining an opening at the top of the length of parison in a portion of the parison extending upwardly above the first mold means, (3) an extendable and retractable blowing and filling assembly with means operative on the length of parison in the first mold means for molding the container with a temporary top opening to provide access to the interior of said container and then filling the molded container with a product through the temporary top opening when said blowing and filling assembly is extended, and (4) sealing mold means effective upon said upwardly extending portion of the parison for sealing the top of the formed and filled container after said blowing and filling assembly is retracted;
the improvement characterized in that a secondary operating means is provided on said apparatus for performing a secondary operation by effecting at least one step selected from the following group of steps: (i) introducing an auxiliary component in said parison top opening, (ii) introducing an additive through said top opening into said container, and (iii) introducing a forming device within said parison top opening, and
the improvement further characterized in that a positioning means is provided for sequentially moving said blowing and filling assembly and said secondary operating means into position over said parison top opening.

12. The improvement in accordance with claim 11 further characterized in that said secondary operating means includes an auxiliary component placement arm having a generally cylindrical anvil surface; in that means are provided for maintaining an auxiliary component on the end of said placement arm; in that means are provided for moving said placement arm with said auxiliary component maintained thereon into said parison top opening to position the auxiliary component within the top opening; in that said sealing mold means includes second mold means for closing about said auxiliary component and the surrounding parison to (1) compress the parison between the exterior surfaces of the auxiliary component and the interior surfaces of said second mold means and thereby seal a formed and filled container about at least a portion of the auxiliary component and (2) press a portion of the parison between the interior surfaces of said second mold means against said anvil surface to form a frangible web in the parison; in that means are provided for retracting said placement arm out of said parison top opening; and in that said sealing mold means also includes third mold means for pressing together said parison above said frangible web and for forming a tab above said formed frangible web after said auxiliary component placement arm has been removed from said parison opening whereby force may be subsequently applied to the formed tab for breaking said frangible web to provide access to said auxiliary component.

13. The improvement in accordance with claim 12 further characterized in that said means for maintaining said auxiliary component on the end of said auxiliary component placement arm includes (1) bores in said arm communicating with the end of said arm and (2) vacuum means for reducing the pressure within said bores whereby said auxiliary component can be maintained on said arm by means of the pressure differential between the ambient atmosphere and the reduced pressure within said bores.

14. The improvement in accordance with claim 13 further characterized in that said placement arm is adapted to hold a nozzle assembly having both a base portion and an upwardly projecting tip or nozzle wherein said base portion presents a generally upwardly facing annular surface extending around said nozzle, in that said placement arm defines a hollow cylindrical interior cavity for receiving said nozzle therein, in that said placement arm has a downwardly facing annular surface around said cylindrical interior cavity, and in that said vacuum bores communicate with said downwardly facing annular surface whereby said nozzle can be held by said arm with said nozzle in said cylindrical interior cavity of said arm and with said upwardly facing annular surface of said nozzle assembly base portion held against the downwardly facing annular surface of said arm.

15. In an apparatus for molding, filling, and sealing a container from the top with the container substantially vertically oriented in a generally upright position; said apparatus including gripping means for maintaining a length of vertically oriented, elongated, hollow tubular parison with a top opening in an upper portion thereof; said apparatus also including a split mold assembly having two first or main mold halves defining a container body forming cavity around said parison below said parison upper portion; said apparatus further including a blowing and filling assembly with means operative at the top of the mold assembly for (1) molding the parison to form the container having a top opening to provide access to the interior of said container and (2) filling the molded container with a product through the top opening; said apparatus further including two second or upper sealing mold halves for sealing the top of the molded and filled container; and said apparatus additionally including sealing mold means for sealing the top opening of the formed and filled container;

the improvement characterized in that (1) a movable carriage is provided for supporting said blowing and filling assembly, (2) a secondary operating means is provided on said carriage for performing a secondary operation by effecting at least one step selected from the following group of steps: (i) introducing an auxiliary component in said parison top opening, (ii) introducing an additive through said top opening into said container, and (iii) introducing a forming device withing said parison top opening, and (3) a positioning means is provided for moving said carriage to sequentially position saids blowing and filling assembly and then said secondary operating means over said container at the top opening.

16. In apparatus for molding, filling, and sealing a container having
   (1) extruder means for extruding a hollow tube of parison at a parison receiving station;
   (2) a movable mold assembly having at least
      (a) openable and closable first or main mold halves,
      (b) openable and closable upper sealing or second mold halves above the main mold halves,
      (c) parison grippers above the second mold halves,
      (d) main mold actuating means for opening and closing said main mold halves,
      (e) second sealing mold half actuating means for opening and closing said second sealing mold halves, and
      (f) gripping means associated with said parison grippers for gripping said parison;
   (3) mold assembly drive means for moving the mold assembly between the parison receiving position adjacent said extruder means and a molding and filling position spaced from said parison receiving station; and
   (4) a blowing and filling assembly at said molding and filling position having means operative at the top of the mold assembly for engaging said hollow tube of parison, for molding the container in the closed main mold halves with a temporary top opening to provide access to the interior of said container, and for filling the molded container with a product through the container temporary top opening;

the improvement characterized in that
   (1) a movable carriage means is provided for supporting said blowing and filling assembly,
   (2) a secondary operating means is provided on said carriage means for performing a secondary operation by effecting at least one step selected from the following group of steps: (i) introducing an auxiliary component in said parison top opening, (ii) introducing an additive through said top opening into said container, and (iii) introducing a forming device within said parison top opening, and
   (3) a positioning means is provided for moving said carriage to first position said blowing and filling assembly and then secondly said operating means over said container at the temporary top opening of the container.

17. The improvement in accordance with claim 16 further characterized in that said secondary operating means includes an auxilliary placement arm having a generally cylindrical surface;

means are provided for maintaining an auxiliary component on the end of said placement arm;

means are provided for moving said placement arm with said auxiliary component thereon into said parison top opening to position the auxiliary component within the top opening;

said second sealing mold half actuating means includes the following: (A) means for closing said second sealing mold halves about said auxiliary component and the surrounding parison to compress the parison between the exterior surfaces of the auxiliary component and the interior surfaces of said second mold halves and thereby seal a molded and filled container about at least a portion of the auxiliary component and (B) means for pressing a portion of the parison with the interior surfaces of said second mold halves against said arm cylindrical surface to form a frangible web in the parison;

means are provided for retracting said placement arm out of said parison top opening; and third mold halves are provided for (A) sealing said parison closed and (B) forming a tab above said formed frangible web after said auxiliary component placement arm has been removed from said parison top opening whereby force may be applied to the formed tab for breaking said frangible web to provide access to said auxiliary component.

18. The improvement in accordance with claim 16 further characterized in that an auxiliary component feeder means is provided for feeding auxiliary components serially to a predetermined position;

a transfer means is provided for receiving an auxiliary component from said feeder means at said predetermined position and for carrying said auxiliary component beneath said secondary operating means when said carriage is located to position said blowing and filling assembly at the temporary top opening of the container;

said secondary operating means includes component placement means for holding and carrying said auxiliary component; and means are provided for (A) reciprocating said component placement means to carry said auxiliary component from said transfer device at an elevated position and (B) lowering said auxiliary component within the top opening of the container when said secondary operating means is positioned over said top opening of the container.

19. The improvement in accordance with claim 18 further characterized in that said auxiliary component feeder means includes a slotted track for feeding auxiliary components in the form of stoppers having a generally cylindrical configuration with a reduced diameter portion received in the track slot;

said transfer means includes an escapement bar having a notch opening toward said track, said bar being adapted to be positioned adjacent one end of said track and to be reciprocated relative thereto in a direction generally normal to the component feeding direction at the end of the track; and said transfer means includes a penumati cylinder and piston actuator connected to said bar for reciprocating said bar.

20. In an apparatus for molding and filling a container from an extruded length of parison; said apparatus having (1) an extruder with at least one extruder head from which the length of parison is extruded, (2) mold means for closing around said extruded length of parison to mold said container, (3) means for filling said container, and (4) parison severing means for severing the extruded length of parison above said closed mold means and below said extruder head; the improvement characterized in that a conduit is provided at an elevation below said extruder head for completely circumsribing a region around said parison, said conduit having a configuration defining a central opening for accommodating the parison extending below said extruder head, said conduit defining at least one aperture therein and communicating at said central opening with the ambient atmosphere around said extruder head, and means are provided with said conduit for reducing the pressure within said conduit whereby ambient atmosphere flows into said conduit so as to exhaust through said conduit the fumes and particulate matter generated when said severing means severs said parison.

21. In an apparatus for molding and filling a container from an extruded length of parison; said apparatus having (1) an extruder with at least one extruder head from which the length of parison is extruded, (2) a motor for operating said extruder, said motor having a housing with air inlet vents at one end adjacent the motor brushes and air outlet vents at the other end, (3) mold means for closing around said extruded length of parison to mold said container, and (4) means for filling the container; the improvement characterized in that an enclosure is provided around said other end of said motor housing and is sealed to said motor housing outwardly of said air outlet vents for receiving the discharge of air from said outlet vents; and removal means are provided for removing air discharged from said motor housing into said enclosure, said removal means including (1) an exhaust conduit connected with said enclosure and (2) pressure reduction means connected to said exhaust conduit for reducing the pressure within said conduit and within said enclosure whereby the discharged air is directed from said motor housing into said enclosure and from said enclosure into said exhaust conduit.

22. An apparatus for forming, filling and closing a container with a stopper by expanding and shaping a heat-sealable polymeric hose completely about the stopper, the apparatus comprising a container-forming mold with split upper and lower parts and a mold-holding fixture for each of the upper mold parts movable in opposite directions;

filling means for supplying contents to the hose while in said mold;

stopper handling means, movable at least vertically inside the hose from above said mold after filling the container, for releasably holding a rubber stopper; and a cross slide for supporting said stopper handling means for horizontal movement relative to said mold;

whereby said stopper handling means can be moved to a receiving position for engaging a stopper and to a position in the hose for placing the stopper therein.

23. An apparatus according to claim 22 wherein a slide carries the rubber stopper to said receiving position.

24. An apparatus according to claim 22 wherein said mold comprises means for retaining the stopper in position in the hose and means for molding the hose completely about the stopper.

* * * * *

UNITED STATES PATENT AND TRADEMARK OFFICE
CERTIFICATE OF CORRECTION

PATENT NO. : 4,707,966

DATED : November 24, 1987

INVENTOR(S) : Gerhard H. Weiler, Paul A. Anderson and Kenneth A. Fox

It is certified that error appears in the above-identified patent and that said Letters Patent is hereby corrected as shown below:

```
Col.  4, line 33, "DAWINGS" should be -- DRAWINGS --.
Col.  4, line 56, "scematic" should be -- schematic --.
Col.  5, line 16, "DECRIPTION" should be -- DESCRIPTION --.
Col. 10, line 38, "ust" should be -- just --.
Col. 26, line 14, "withing" should be -- within --.
Col. 26, line 17, "saids" should be -- said --.
Col. 28, line  1, "penumati" should be -- pneumatic --.
Col. 28, line 15, "circumsribing" should be -- circumscribing --.
```

Signed and Sealed this

Twenty-sixth Day of July, 1988

Attest:

DONALD J. QUIGG

*Attesting Officer*     *Commissioner of Patents and Trademarks*